US012625780B2

(12) United States Patent
Park et al.

(10) Patent No.: US 12,625,780 B2
(45) Date of Patent: May 12, 2026

(54) QUADRATURE ERROR CORRECTION CIRCUIT AND MEMORY DEVICE HAVING THE SAME

(71) Applicant: SAMSUNG ELECTRONICS CO., LTD., Suwon-si (KR)

(72) Inventors: Junyoung Park, Suwon-si (KR); Joohwan Kim, Suwon-si (KR); Jindo Byun, Suwon-si (KR); Eunseok Shin, Suwon-si (KR); Hyunyoon Cho, Suwon-si (KR); Junghwan Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 14 days.

(21) Appl. No.: 18/383,350

(22) Filed: Oct. 24, 2023

(65) Prior Publication Data

US 2024/0241802 A1     Jul. 18, 2024

(30) Foreign Application Priority Data

Jan. 13, 2023     (KR) ........................ 10-2023-0005533

(51) Int. Cl.
G06F 11/16 (2006.01)
G06F 1/10 (2006.01)
(52) U.S. Cl.
CPC ........... G06F 11/1604 (2013.01); G06F 1/10 (2013.01); G06F 2201/805 (2013.01)
(58) Field of Classification Search
CPC ... G06F 11/1604; G06F 1/10; G06F 2201/805
See application file for complete search history.

(56) References Cited

U.S. PATENT DOCUMENTS

| | | | |
|---|---|---|---|
| 7,844,021 B2 | 11/2010 | Gibbons et al. | |
| 8,514,005 B2 * | 8/2013 | Huang | ................. H03L 7/0812 |
| | | | 327/298 |
| 9,485,082 B1 | 11/2016 | Sun et al. | |
| 10,237,052 B1 | 3/2019 | Moscone | |
| 10,630,272 B1 | 4/2020 | Ashtiani et al. | |
| 11,341,002 B1 * | 5/2022 | Izad | .................... G06F 11/1604 |
| 11,973,630 B1 * | 4/2024 | Spear | ..................... H04J 3/047 |

(Continued)

FOREIGN PATENT DOCUMENTS

| | | |
|---|---|---|
| KR | 10-2006-0057712 A | 5/2006 |
| KR | 10-2223652 B1 | 3/2021 |

*Primary Examiner* — Hyun Soo Kim
(74) *Attorney, Agent, or Firm* — Sughrue Mion, PLLC

(57) ABSTRACT

The memory device includes a clock receiver receiving an external clock signal, a transmitter receiving first to Nth data in parallel and sequentially outputting the first to Nth data based on first to Nth clock signals including different phases, and a QEC circuit correcting a skew between the first to Nth clock signals, wherein the external clock signal includes a same frequency as the first to Nth clock signals, and the QEC circuit selectively receives the first clock signal among the first to Nth clock signals, generates the second clock signal including a phase different from a phase of the first clock signal based on a delay operation with respect to the first clock signal, and corrects the skew between the first to Nth clock signals by performing a phase comparison between the first to Nth clock signals generated based on the first and second clock signals.

18 Claims, 14 Drawing Sheets

(56)                    References Cited

U.S. PATENT DOCUMENTS

| | | | |
|---|---|---|---|
| 2007/0076832 A1* | 4/2007 | Matsudera | H03L 7/18 375/376 |
| 2009/0184743 A1* | 7/2009 | Kim | H03L 7/0812 327/161 |
| 2011/0007591 A1* | 1/2011 | Lee | G11C 7/1057 365/219 |
| 2011/0080382 A1* | 4/2011 | Koo | G09G 3/20 327/108 |
| 2017/0097655 A1* | 4/2017 | Jeon | G06F 1/10 |
| 2019/0385654 A1* | 12/2019 | Lee | G11C 16/32 |

* cited by examiner

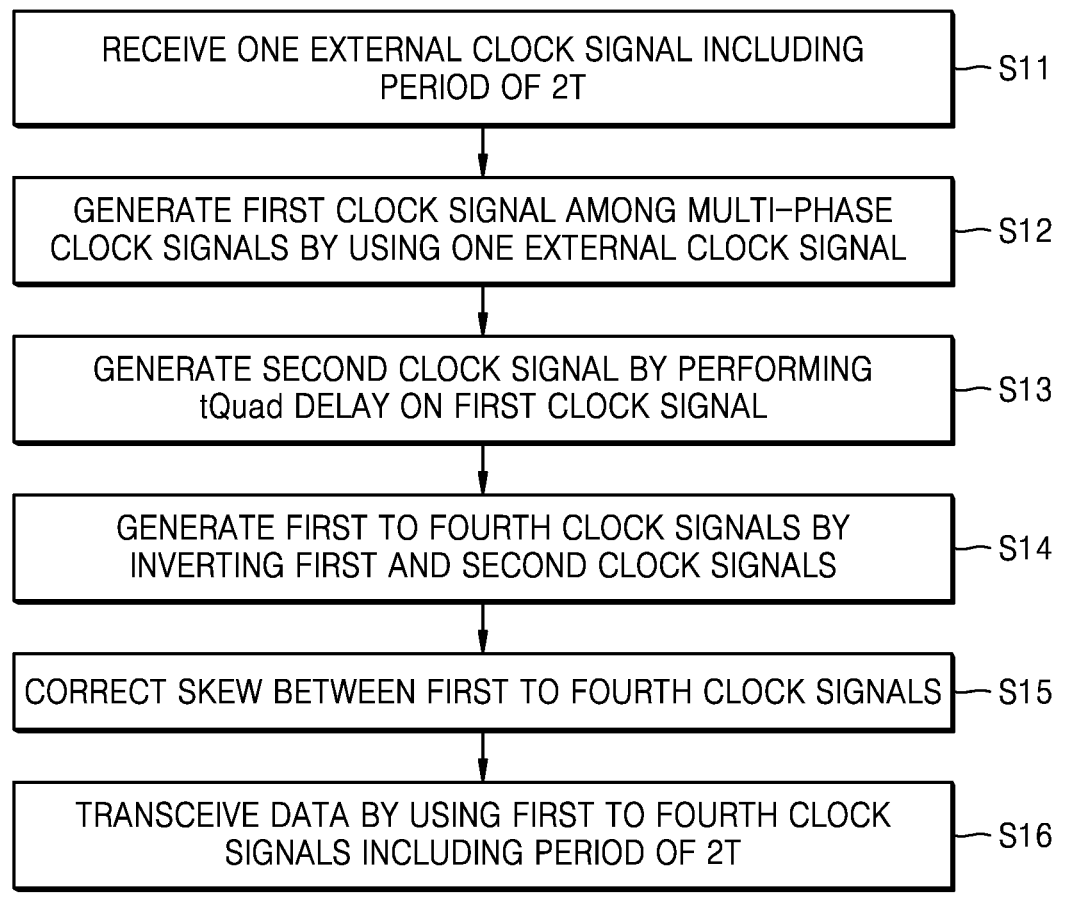

RECEIVE ONE EXTERNAL CLOCK SIGNAL INCLUDING PERIOD OF 2T — S11

GENERATE FIRST CLOCK SIGNAL AMONG MULTI-PHASE CLOCK SIGNALS BY USING ONE EXTERNAL CLOCK SIGNAL — S12

GENERATE SECOND CLOCK SIGNAL BY PERFORMING tQuad DELAY ON FIRST CLOCK SIGNAL — S13

GENERATE FIRST TO FOURTH CLOCK SIGNALS BY INVERTING FIRST AND SECOND CLOCK SIGNALS — S14

CORRECT SKEW BETWEEN FIRST TO FOURTH CLOCK SIGNALS — S15

TRANSCEIVE DATA BY USING FIRST TO FOURTH CLOCK SIGNALS INCLUDING PERIOD OF 2T — S16

FIG. 9

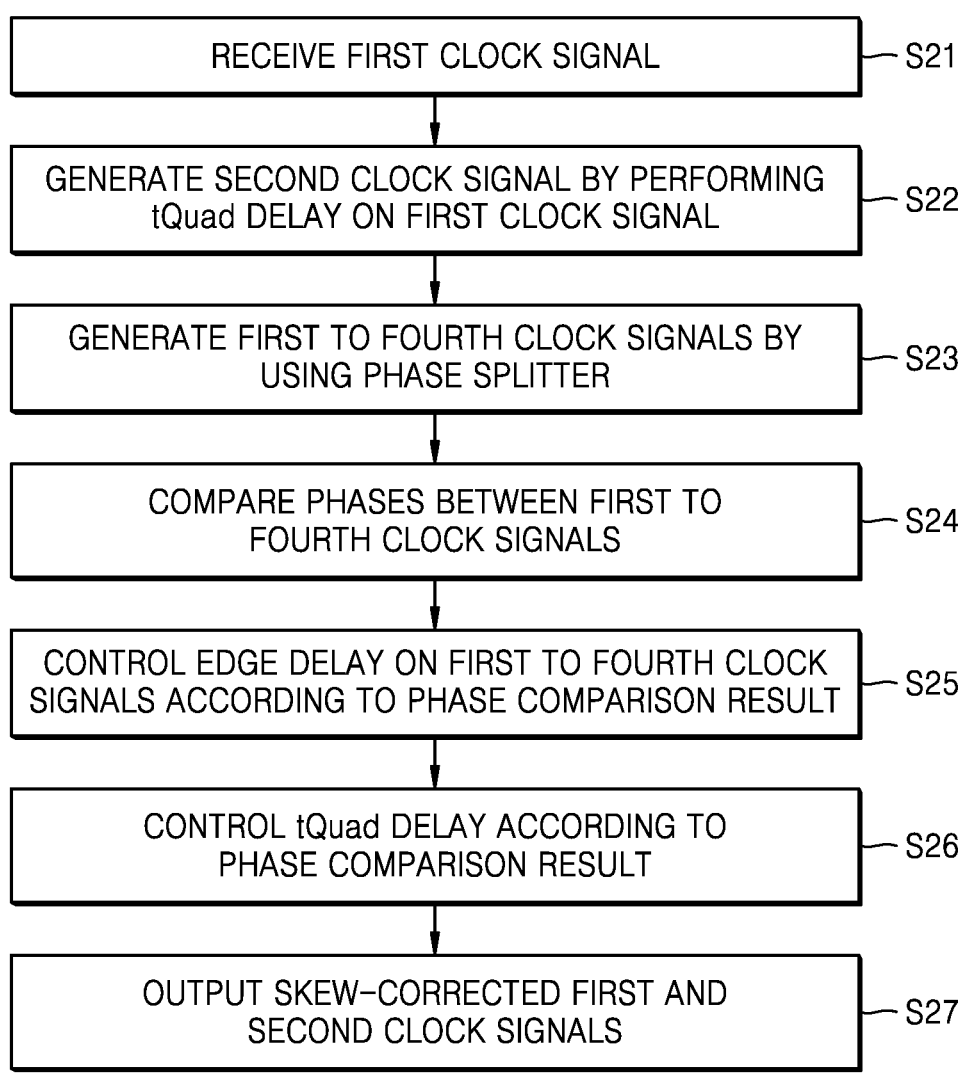

RECEIVE FIRST CLOCK SIGNAL — S21

GENERATE SECOND CLOCK SIGNAL BY PERFORMING tQuad DELAY ON FIRST CLOCK SIGNAL — S22

GENERATE FIRST TO FOURTH CLOCK SIGNALS BY USING PHASE SPLITTER — S23

COMPARE PHASES BETWEEN FIRST TO FOURTH CLOCK SIGNALS — S24

CONTROL EDGE DELAY ON FIRST TO FOURTH CLOCK SIGNALS ACCORDING TO PHASE COMPARISON RESULT — S25

CONTROL tQuad DELAY ACCORDING TO PHASE COMPARISON RESULT — S26

OUTPUT SKEW-CORRECTED FIRST AND SECOND CLOCK SIGNALS — S27

Figure 12:
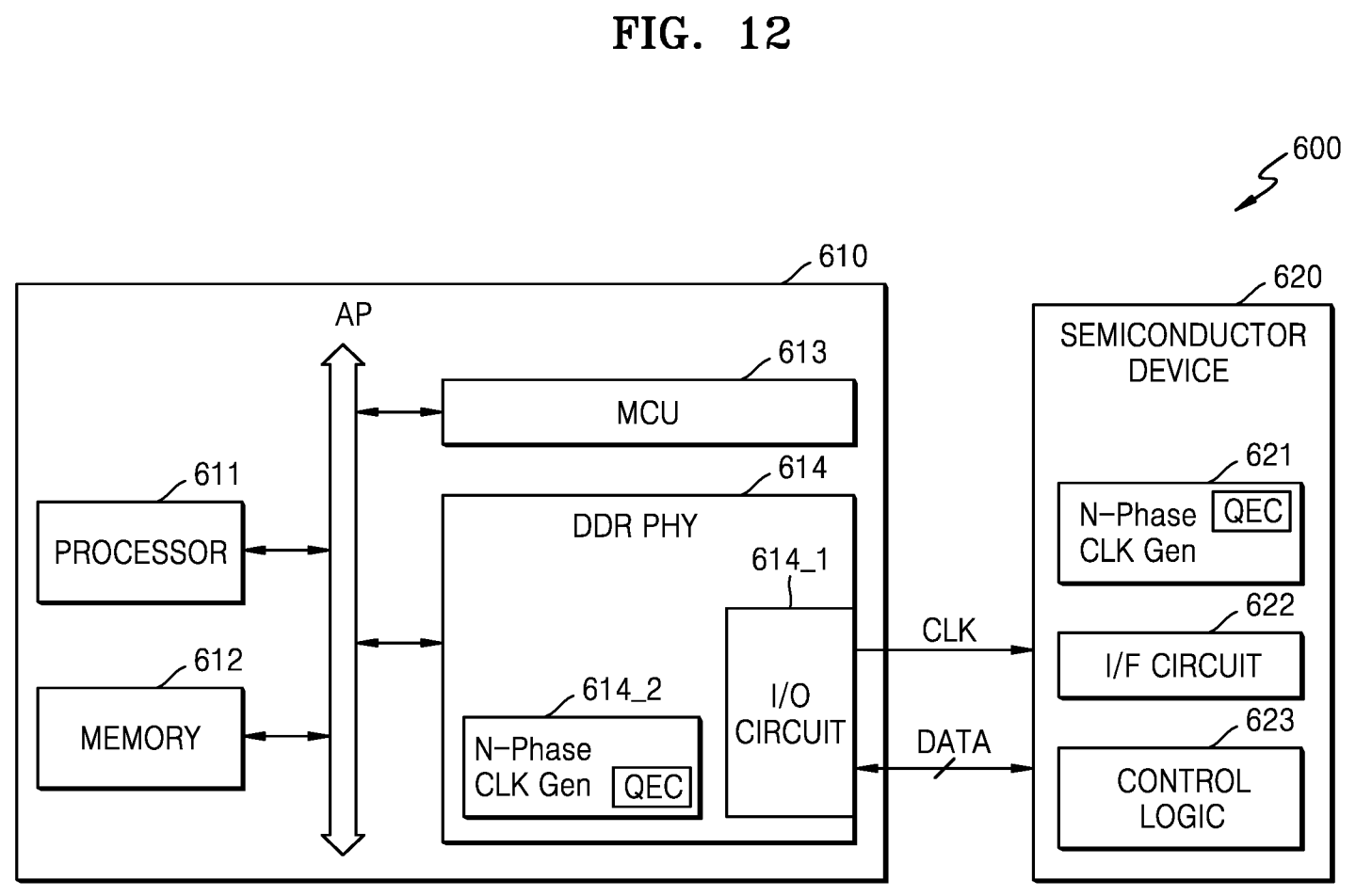

SEMICONDUCTOR
DEVICE                          620

N-Phase
CLK Gen    QEC              621

I/F CIRCUIT                 622

CONTROL
LOGIC                       623

CLK

DATA

610

MCU                        613

DDR PHY                    614

614_1

I/O
CIRCUIT

614_2

N-Phase
CLK Gen    QEC

AP

611    PROCESSOR

612    MEMORY

QUADRATURE ERROR CORRECTION CIRCUIT AND MEMORY DEVICE HAVING THE SAME

CROSS-REFERENCE TO RELATED APPLICATION

This application is based on and claims priority under 35 U.S.C. § 119 to Korean Patent Application No. 10-2023-0005533, filed on Jan. 13, 2023, in the Korean Intellectual Property Office, the disclosure of which is incorporated by reference herein in its entirety.

BACKGROUND

1. Field

The disclosure relates to a quadrature error correction circuit, and more particularly, to a quadrature error correction circuit to correct a skew between multi-phase clock signals and a memory device including the quadrature error correction circuit.

2. Description of Related Art

Memory devices, such as Low Power Double Data Rate (LPDDR) Synchronous Dynamic Random Access Memory (SDRAM) and the like, may be used in various types of electronic devices, such as smartphones, wearable devices tablet personal computers (PCs), and ultrabooks, and the like.

The memory devices may operate according to various specifications such as LPDDR, Double Data Rate x (DDRx), and the like. The memory device may receive a preset clock signal from a memory controller, generate multi-phase clock signals by using the received clock signal, and receive write-data or transmit read-data to the memory controller by using the generated multi-phase clock signals. Since a skew between the multi-phase clock signals degrades data-transceiving characteristics, the skew between multi-phase clock signals may need to be properly corrected. However, power consumption may need to be reduced in a process of generating the multi-phase clock signals.

SUMMARY

An aspect of the disclosure provides a quadrature error correction (QEC) circuit, which increases the degree of integration and reduces power consumption by eliminating one or more of circuit blocks in a related art the memory device.

According to an aspect of the disclosure, there is provided a memory device including: a clock receiver configured to receive an external clock signal: a transmitter configured to receive a plurality of data in parallel and sequentially output the plurality of data based on a plurality of clock signals having a same frequency as the external clock signal, each one of the plurality of clock signals having a phase different from another one of the plurality of clock signals; and a quadrature error correction (QEC) circuit configured to: selectively receive a first clock signal among the plurality of clock signals, the first clock signal having a first phase, generate a second clock signal based on a delay operation with respect to the first clock signal, the second clock signal having a second phase different from the first phase of the first clock signal, and correct a skew between the plurality of clock signals by performing a first phase comparison between the plurality of clock signals generated based on the first clock signal and second clock signal.

According to another aspect of the disclosure, there is provided a memory device including: a clock receiver configured to receive a differential signal corresponding to a 4-division signal of a data rate as an external clock signal: a buffer configured to output a first clock signal and an inversion signal of the first clock signal based on a buffering operation on the differential signal: a first multiplexer configured to receive the first clock signal and the inversion signal of the first clock signal and selectively output the first clock signal: a quadrature error correction (QEC) circuit configured to receive the first clock signal from the first multiplexer, internally generate 4-phase clock signals including the first clock signal, a second clock signal, a third clock signal, and a fourth clock signal based on the first clock signal, correct a skew between the first to fourth clock signals, and output the skew-corrected first clock signal and the skew-corrected second clock signal: a clock generation circuit configured to output the first to fourth clock signals based on the skew-corrected first clock signal and the second clock signal received from the QEC circuit: and a transceiving circuit configured to receive first data, second data, third data and fourth data in parallel and sequentially output the first to fourth data based on the first to fourth clock signals output from the clock generation circuit.

According to another aspect of the disclosure, there is provided a quadrature error correction (QEC) circuit including: a first delayer configured to receive a first clock signal and output a second clock signal having a phase delay of 90 degrees with respect to the first clock signal: an edge controller configured to control a first rising edge or a first falling edge of the first clock signal based on a first control code, and control a second rising edge or a second falling edge of the second clock signal based on a second control code; a phase splitter configured to perform a signal processing on the first clock signal and the second clock signal to generate 4-phase clock signals including the first clock signal, the second clock signal, a third clock signal, and a fourth clock signal: a multiplexer configured to selectively output two clock signals among the first to fourth clock signals: a phase detector configured to perform a first phase comparison operation based on the two clock signals output from the multiplexer and provide a comparison result: and a control code generator configured to generate the first control code and the second control code based on the comparison result output from the phase detector.

BRIEF DESCRIPTION OF DRAWINGS

Embodiments will be more clearly understood from the following detailed description taken in conjunction with the accompanying drawings in which:

FIG. 3 is a block diagram illustrating an implementation of a memory device according to an embodiment;

FIG. 5 is a block diagram illustrating an implementation of a QEC circuit according to an embodiment;

FIG. 8 is a flowchart illustrating a method of operating a memory device, according to an embodiment;

FIG. 9 is a flowchart illustrating a method of operating a memory device, according to another embodiment;

FIG. 10 is a block diagram illustrating an implementation of a QEC circuit according to an embodiment;

FIG. 12 is a block diagram illustrating a data processing system including a System on Chip according to an embodiment.

DETAILED DESCRIPTION

Figure 1:
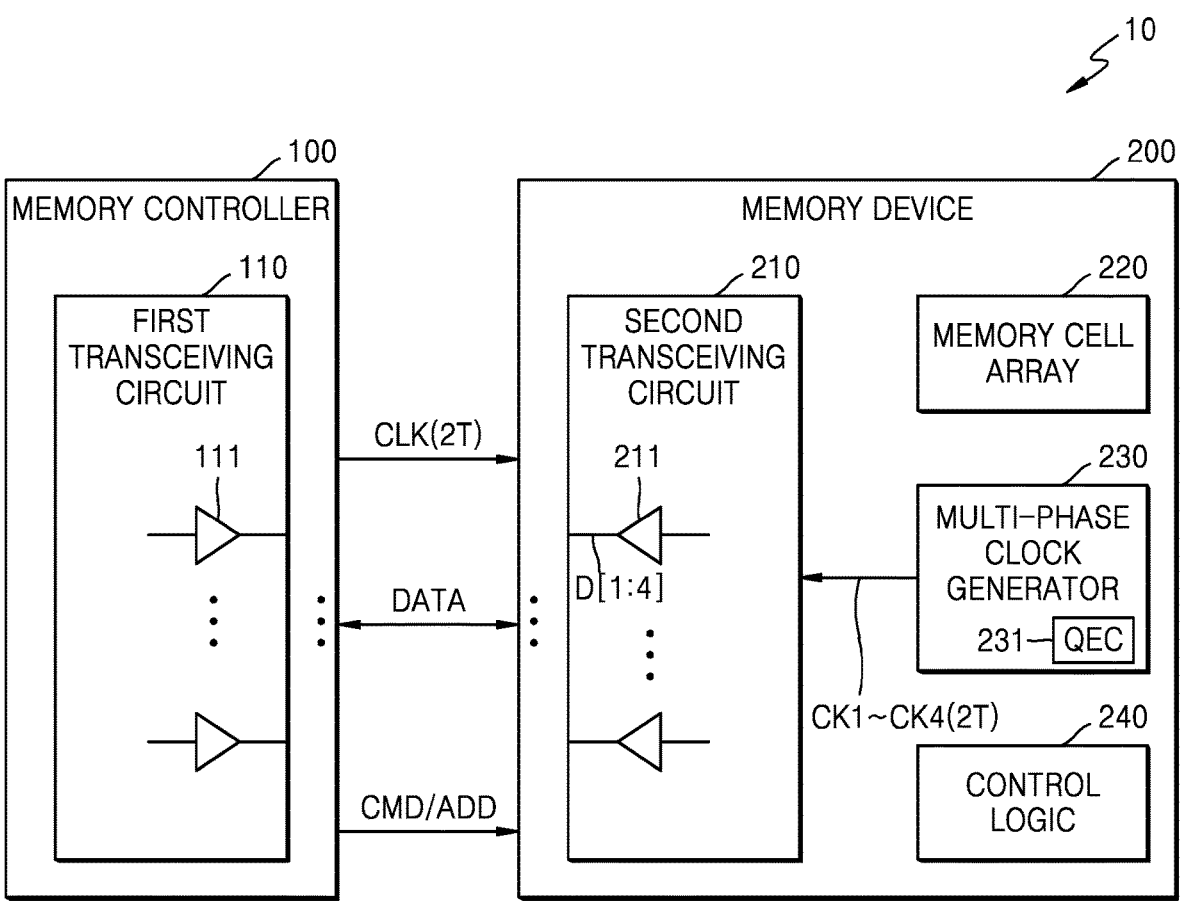
FIG. 1 is a block diagram illustrating a memory system including a memory device, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples. As used herein, an expression "at least one of" preceding a list of elements modifies the entire list of the elements and does not modify the individual elements of the list. For example, an expression, "at least one of a, b, and c" should be understood as including only a, only b, only c, both a and b, both a and c, both b and c, or all of a, b, and c.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all example embodiments are not limited thereto.

The embodiments of the disclosure are example embodiments, and thus, the disclosure is not limited thereto and may be realized in various other forms. As is traditional in the field, embodiments may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Hereinafter, embodiments of the disclosure will be described in detail with reference to the accompanying drawings.

FIG. 1 is a block diagram illustrating a memory system including a memory device, according to an embodiment.

Referring to FIG. 1, a memory system 10 may include a memory controller 100 and a memory device 200. The memory system 10 may be implemented to be included in personal computers (PCs), mobile electronic devices, or data servers. The mobile electronic devices may include laptop computers, mobile phones, smartphones, tablet PCs, personal digital assistants (PDAs), enterprise digital assistants (EDAs), digital still cameras, digital video cameras, Portable Multimedia Players (PMPs), Personal/Portable Navigation Devices (PNDs), handheld game consoles, Mobile Internet Devices (MIDs), wearable computers, Internet of Things (IOT), Internet of Everything (IoE) devices, or drones.

The memory controller 100 may be implemented as an integrated circuit (IC), a System on Chip (SoC), an application processor (AP), a mobile AP, a chipset, or a set of chips, or be included therein. The memory controller 100 may be a semiconductor device that performs a memory control function. In an example, in which, the memory controller 100 corresponds to AP, the memory controller 100 may include a memory control logic, random-access memory (RAM), a central processing unit (CPU), a graphics processing unit (GPU), and/or a modem.

In response to a write or read request of a host, the memory controller 100 may control the memory device 200 to read data DATA stored in the memory device 200 or write data DATA to the memory device 200. Specifically, the memory controller 100 may control write and read operations of data DATA of the memory device 200 by providing an address ADD and a command CMD to the memory device 200. In addition, the data DATA may be transceived between the memory controller 100 and the memory device 200 by using a plurality of data channels. According to an example, the data DATA being transceived between the memory controller 100 and the memory device 200 may mean that the data DATA is transmitted from the memory controller 100 to the memory device 200 or the data DATA is received from the memory controller 100 from the memory device 200.

The memory controller 100 may access the memory device 200 based on a request of the host, and may communicate with the host by using various protocols. For example, the memory controller 100 may communicate with the host by using interface protocols such as Peripheral Component Interconnect-Express (PCI-E), Advanced Technology Attachment (ATA), Serial ATA (SATA), Parallel ATA (PATA), or serial attached SCSI (SAS). In addition, various other interface protocols such as Universal Serial Bus (USB), Multi-Media Card (MMC), Enhanced Small Disk Interface (ESDI), or Integrated Drive Electronics (IDE) may be applied to the protocol between the host and the memory controller 100.

The memory device 200 may include volatile memory devices. The volatile memory devices may include random access memory (RAM), dynamic RAM (DRAM), or static RAM (SRAM) but is not limited to RAM, DRAM, and SRAM. For example, the memory device 200 may include Double Data Rate Synchronous Dynamic Random Access Memory (DDR SDRAM), Low Power Double Data Rate (LPDDR) SDRAM, Graphics Double Data Rate (GDDR) SDRAM, Rambus Dynamic Random Access Memory (RDRAM), and the like. Alternatively, the memory device 200 may include high bandwidth memory (HBM).

In addition, the memory device 200 may include non-volatile memory devices. As an example, the memory device 200 may include resistive memory devices such as magnetic RAM (MRAM), ferroelectric RAM (FeRAM), phase change RAM (PRAM), and resistive RAM (ReRAM). In addition, the memory device 200 may include various memory devices to use multi-phase clock signals according to embodiments, and as an example, the memory device 200 may include a flash memory device.

For example, the memory controller 100 and the memory device 200 may each include a transceiving circuit, the memory controller 100 may include a first transceiving circuit 110, and the memory device 200 may include a second transceiving circuit 210. A transceiving circuit may include one or more transmitters to transmit data and one or more receivers to receive data. As an example, a transmitter 111 of the first transceiving circuit 110 may transmit the write-data to the memory device 200, and a transmitter 211 of the second transceiving circuit 210 may transmit the read-data to the memory controller 100. In some embodiment, the transceiving circuit may be referred to as a transceiver.

The memory device 200 may further include a memory cell array 220, a multi-phase clock generator 230, and a control logic 240. The multi-phase clock generator 230 may utilize an external clock signal CLK provided by the memory controller 100 to generate multiple clock signals including different phases, and synchronize the multi-phase clock signals to an operation of the memory system 10. For example, the multiple clock signals including different phases may be multi-phase clock signals. As an example, in the case that the multi-phase clock generator 230 generates 4-phase clock signals, the 4-phase clock signals may include first to fourth clock signals including a phase difference of 0 degree, 90 degrees, 180 degrees, or 270 degrees relative to the external clock signal CLK. In other words, these four signals in this order have a sequential phase difference of 90 degrees by being shifted in phase by 90 degrees relative to the immediately previous one, creating a sequential pattern of 90-degree phase differences. For example, the second clock signal may be shifted in phase by 90 degrees relative to the first clock signal, the third clock signal may be shifted in phase by 90 degrees relative to the second clock signal, and the fourth clock signal may be shifted in phase by 90 degrees relative to the third clock signal. However, the disclosure is not limited thereto, and as such, according to another embodiment, the first to fourth clock signals may be defined as having a sequential phase difference of 90 degrees regardless of a phase of the external clock signal CLK.

The control logic 240 may control all internal operations of the memory device 200. As an example, the control logic 240 may control clock signal generation operations of the multi-phase clock generator 230. However, the disclosure is not limited thereto, and as such, some internal operations of the memory device 200 may be controlled by external signals. The transmitter may receive pieces of data in parallel and output the received multiple data sequentially in synchronization with the multi-phase clock signals. Also, the receiver may receive data in parallel and output the received data sequentially in synchronization with the multi-phase clock signals.

For example, the first transmitter 211 may receive a first clock signal CK1, a second clock signal CK2, a third clock signal CK3, and a fourth clock signal CK4 from the multi-phase clock generator 230, and a first data D1, a second data D2, a third data D3, and a fourth data D4 read out from the memory cell array 220. The first to fourth clock signals CK1 to CK4 may include a phase difference of 90 degrees from each other, and the first to fourth data D1 to D4 read out from the memory cell array 220 may be received in parallel. In addition, the first transmitter 211 may sequentially output the first to fourth data D1 to D4 at edge timings of the first to fourth clock signals CK1 to CK4. Accordingly, in the case that a data output speed is compared with each period of the first to fourth clock signals CK1 to CK4, the memory device 200 may operate at a quad data rate (QDR) in which four pieces of data are output at each period of the clock signal.

The memory device 200 may generate the first to fourth clock signals CK1 to CK4 by using the external clock signal CLK received from the memory controller 100. According to an embodiment, the external clock signal CLK may include a frequency (or a period divided by 4) corresponding to a quarter of the data transceiving rate of a transceiver. The data transceiving rate may be expressed as a data rate, for example, assuming that a period of the external clock signal CLK is 2T, and each of the first to fourth clock signals CK1 to CK4 may include a same period 2T as the period of the external clock signal CLK. In the case that the first to fourth data D1 to D4 are output at the edge timings of the first to fourth clock signals CK1 to CK4, a data output period may include a value of T/2 accordingly. The transceiver may be a combination of a transmitter and a receiver.

According to an embodiment, the memory device 200 may not need to receive a high frequency external clock signal when generating the first to fourth clock signals CK1 to CK4 and may not need to include a frequency dividing circuit to divide the high frequency. For example, a case which the memory device 200 receives the external clock signal CLK with a relatively low frequency and generates the multi-phase signals with a same frequency as the external clock signal CLK may be advantageous in terms of power consumption compared to a case which the memory device 200 receives the external clock signal CLK with a relatively high frequency. In an example, the relatively low frequency may be a frequency below a threshold value, and the relatively high frequency may be a frequency equal to or above the threshold value.

Furthermore, as described below, since the memory device 200 according to an embodiment does not require two or more external clock signals including different phases (e.g., the phase difference of 90 degrees) to be received together for accurate skew correction between the multi-phase signals, the 4-phase clock signals may be generated in a circuit configuration (e.g., a quadrature error correction (QEC) circuit 231) inside the memory device 200 and the skew may be corrected by using the 4-phase clock signals. In the embodiment shown in FIG. 1, the QEC circuit 231 is shown as being provided inside the multi-phase clock generator 230, but the QEC circuit 231 may be disposed outside the multi-phase clock generator 230.

In a comparative example, a memory device may receive the external clock signal having a higher frequency than the multi-phase clock signals through a clock buffer and divide the external clock signal into the 4-phase clock signals based on a division operation on the external clock signal. On the other hand, since the memory device 200 according to an embodiment of the disclosure may receive the external clock signal having the frequency corresponding to the multi-phase clock signals without using a dividing circuit, power consumption generated in a process of receiving and dividing the clock may be reduced.

In addition, for correcting the skew between the 4-phase clock signals, a related QEC circuit receives the external clock signals having a phase difference of 90 degrees from each other and performs the skew correction operations. However, according to an embodiment, the clock signal having the phase difference of 90 degrees may be generated based on any one clock signal inside the QEC circuit, and the skew between the 4-phase clock signals may be corrected based on the clock signal. In an example embodiment, in which, the memory device receives the external clock signal including a lower frequency than the comparative example from the outside instead of two or more external clock signals having different phases, the number of pads to receive the external clock signal may be reduced, and since the number of signal processing paths to process the external clock signals is reduced, a circuit configuration required for the memory device 200 may be reduced. As a result, the degree of integration of the memory device 200 may be improved.

According to an embodiment, the memory device 200 may generate the multi-phase clock signals by using various signals output from the memory controller 100. According to an embodiment, the memory device 200 may generate the multi-phase clock signals by using a write clock WCK defined in an LPDDRx specification such as LPDDR5 or LPDDR6 or a graphics DDR (GDDR) specification.

Although an operation performed by the memory device 200 is illustrated according to the above embodiment, the disclosure is not limited thereto, and as such, according to an embodiment, the operation performed by the memory device 200 may also be performed by the memory controller 100. As an example, the memory controller 100 may internally generate the multi-phase clock signals and use the generated multi-phase clock signals to transceive data. In this case, the memory controller 100 may generate the multi-phase clock signals by using an internal clock signal corresponding to a signal obtained by dividing the data rate by 4, and since the memory controller 100 includes circuit configurations identical to or similar to configurations of the memory device 200, the skew between the multi-phase clock signals may be corrected by using an identical or similar method.

Figure 2A:
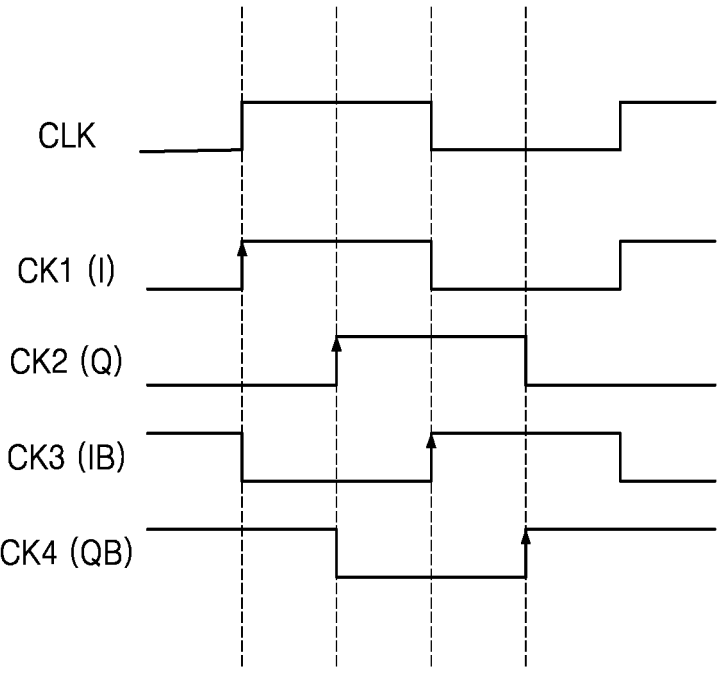
FIGS. 2A and 2B are waveform diagrams illustrating a generation of 4-phase clock signals and an operation of outputting data.
Figure 2B:
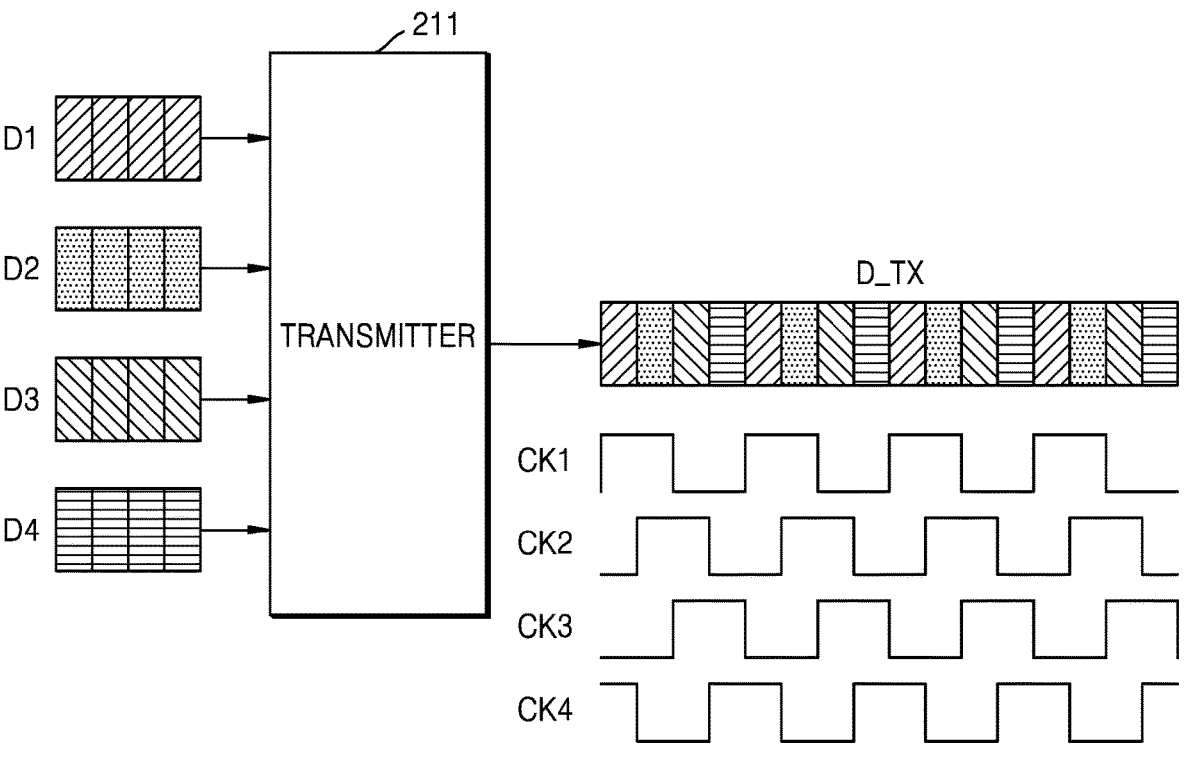

FIGS. 2A and 2B are waveform diagrams illustrating a generation of 4-phase clock signals and an operation of outputting data:

As shown in FIG. 2A, the 4-phase clock signals may include first to fourth clock signals CK1 to CK4. For example, the first clock signal CK1 may be clock signal I, the second clock signal CK2 may be clock signal Q, the third clock signal CK3 may be clock signal IB, and the fourth clock signal CK4 may be clock signal QB. The first to fourth clock signals CK1 to CK4 may include a same period as the clock signal CLK. The first clock signal CK1 and the second clock signal CK2 may include a phase difference of 90 degrees, the second clock signal CK2 and the third clock signal CK3 may include a phase difference of 90 degrees, the third clock signal CK3 and the fourth clock signal CK4 may include a phase difference of 90 degrees, and the fourth clock signal CK4 and the first clock signal CK1 may include a phase difference of 90 degrees.

As shown in FIG. 2B, the first data D1 may be output at an edge timing of the first clock signal CK1, the second data D2 may be output at an edge timing of the second clock signal CK2, the third data D3 may be output at an edge timing of the third clock signal CK3, and the fourth data D4 may be output at an edge timing of the fourth clock signal CK4. In the case that there is a skew in the phase between the first to fourth clock signals CK1 to CK4, the data-transceiving characteristics of the first to fourth data D1 to D4 may be degraded. As such, accurate skew correction between the first to fourth clock signals CK1 to CK4 may be required.

Referring to FIG. 2B, the transmitter 211 of the memory device 200 may receive the first to fourth data D1 to D4 in parallel and output the first to fourth data D1 to D4 sequentially at the edge timings of the first to fourth clock signals CK1 to CK4. FIG. 2B may illustrate a case in which each of the first to fourth clock signals CK1 to CK4 includes a duty ratio of 50%, and the first to fourth data D1 to D4 are output in synchronization with the edge timing of the first to fourth clock signals CK1 to CK4.

In the embodiment illustrated in FIG. 2B, the case which each of the first to fourth clock signals CK1 to CK4 includes a duty ratio of 50% is illustrated, but the disclosure is not limited to the duty ration of 50%. As such, according to another embodiment, the duty ration may be different that 50%. For example, the duty ratio of each of the first to fourth clock signals CK1 to CK4 may include a value less than 50%, or the duty ratio thereof may be set such that logic high portions of the first to fourth clock signals CK1 to CK4 do not overlap each other.

Figure 3:
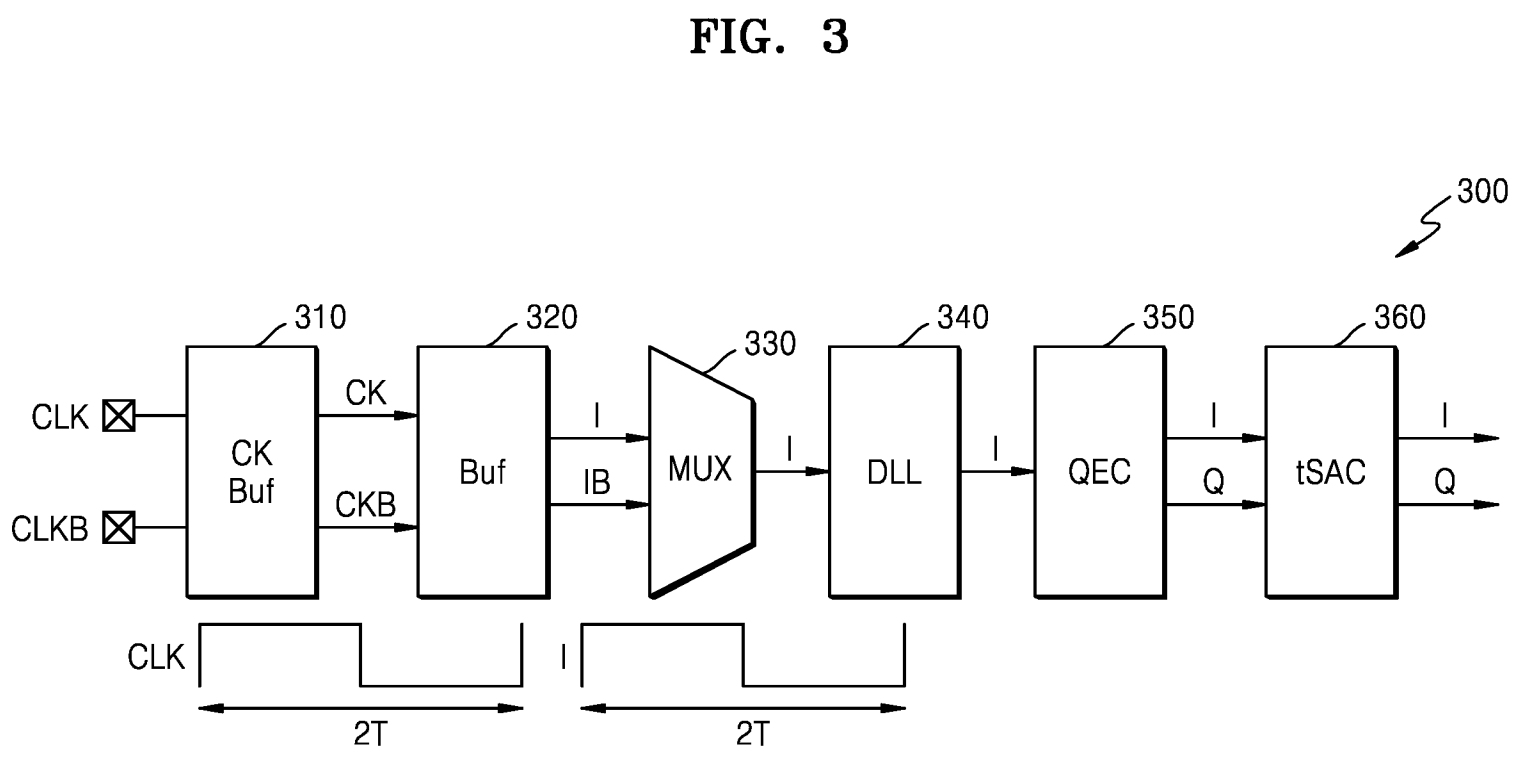

FIG. 3 is a block diagram illustrating an implementation of a memory device according to an embodiment. In the following embodiments, it is assumed that the multi-phase clock signals according to embodiments may include the first to fourth clock signals. However, the disclosure is not limited thereto, and as such, the number of multi-phase clock signals may be less than four or greater than four.

In addition, in FIG. 3, a process of generating the first and second clock signals having a phase difference of 90 degrees from each other based on the external clock signal is illustrated, and an operation in which the first to fourth clock signals are generated inside the QEC circuit and the skew between the first to fourth clock signals is corrected is illustrated. Some of the components shown in FIG. 3 may configure the multi-phase clock generator 230 shown in the embodiment of FIG. 1. However, the disclosure is not limited thereto, and as such, some components may be omitted and/or other components may be added.

Referring to FIG. 3, a memory device 300 may include a clock buffer (CK Buf) 310, a buffer (Buf) 320, a multiplexer (MUX) 330, a delay locked loop (DLL) circuit 340, a quadrature error correction (QEC) circuit 350, and a tSAC delayer 360. According to an embodiment, a delay locked loop or a phase locked loop may be optionally applied. In the following embodiments, a case in which a delay lock loop is applied to a memory device is illustrated.

The clock buffer 310 may receive an external clock signal CLK with one phase. For example, the external clock signal CLK may be provided to the clock buffer 310 in a form of a differential signals CLK and CLKB, and the signal CLKB of the differential signal may include an inversion waveform of the external clock signal CLK.

The buffer 320 may buffer the differential signals CLK and CLKB and output the buffered differential signal. The signals output from the buffer 320 may include the first clock signal I of the 4-phase clock signals and an inversion signal of the first clock signal I. The inversion signal of the first clock signal I may correspond to the third clock signal IB. Furthermore, according to the above-described embodiment, the external clock signal CLK may include a frequency corresponding to a signal divided by 4 relative to the data rate, and since any division processing is not performed on the external clock signal CLK, the frequency of the external clock signal CLK may include substantially a same frequency as a frequency of the first clock signal I and the third clock signal IB.

The multiplexer 330 may receive the first clock signal I and the third clock signal IB and output one of the first clock signal I and the third clock signal IB. In the example illustrated in FIG. 3, the multiplexer 330 outputs the first clock signal I. However, in another example, the multiplexer 330 may output the third clock signal IB.

The delay locked loop circuit 340 may receive an output from the multiplexer 330 and output a phase-regulated first clock signal I an input to the QEC circuit 350. The delay locked loop circuit 340 may also be referred to as a phase locked loop (PLL) circuit 340. As such, the phase-regulated first clock signal I may be provided as the input to the QEC circuit 350 through the Delay locked loop 340. According to another embodiment, the delay locked loop (DLL) circuit 340 may be provided within the multiplexer 330 to output the phase-regulated first clock signal I.

The QEC circuit 350 may receive the clock signal and utilize the clock signal to perform the skew correction operation on the multi-phase clock signals. According to an embodiment, the QEC circuit 350 may utilize the first clock signal I provided as an input to correct the skew between the first to fourth clock signals I, Q, IB, and QB corresponding to the 4-phase clock signals and output the skew-corrected at least one clock signal. According to an embodiment, the QEC circuit 350 may generate the signals corresponding to the first to fourth clock signals I, Q, IB, and QB in an internal signal processing process, perform the skew correction operation on the signals, and output the skew-corrected first clock signal I and the second clock signal Q.

The tSAC delayer 360 may receive the first clock signal I and the second clock signal Q, delay the first clock signal I and the second clock signal Q by a amount of time, and output the first clock signal I and the second clock signal Q. The amount of time may be a predetermined or predefined amount of time. According to an embodiment, tSAC may correspond to a data output delay time, and the tSAC delayer 360 may perform a delay operation to compensate for an internal clock signal by the data output delay time. As an example, the tSAC delayer 360 may perform the delay operation by using a clock tree.

As shown in FIG. 3, according to an embodiment, the 4-phase clock signals may be generated by using the external clock signal CLK corresponding to the signal obtained by dividing the data rate by 4, and the QEC circuit 350 may correct the skew between the 4-phase clock signals by using any one of the 4-phase clock signals (e.g., the first clock signal I). Accordingly, the skew-corrected 4-phase clock signals may be generated based on one external clock signal CLK or one differential external clock signal without receiving a plurality of external clock signals including the different phases. As such, circuit elements required to generate the 4-phase clock signals including the QEC processing may be reduced and power consumption may also be reduced.

Figure 4:
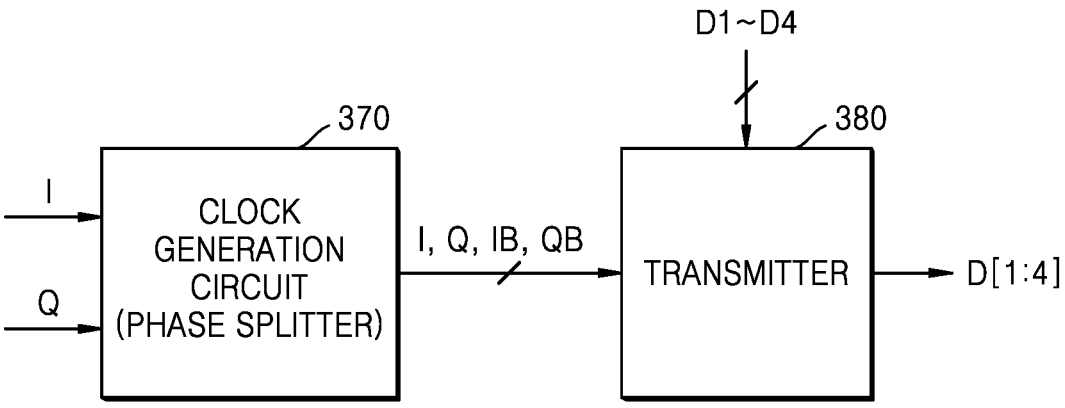
FIG. 4 is a block diagram illustrating a data transmission process of a memory device according to an embodiment.

FIG. 4 is a block diagram illustrating a data transmission process of a memory device according to an embodiment.

Referring to FIGS. 3 and 4, the memory device may include the QEC circuit 350, the tSAC delayer 360, a phase splitter 370, and a transmitter 380, and the transmitter 380 may receive the first to fourth data D1 to D4 in parallel and include a serializer function that outputs the first to fourth data D1 to D4 sequentially in synchronization with the first to fourth clock signals I, Q, IB, and QB. The phase splitter 370 may receive the first clock signal I and the second clock signal Q and generate the first to fourth clock signals I, Q, IB, and QB based on a phase delay operation on the clock signals. The first to fourth clock signals I, Q, IB, and QB may be provided to the transmitter 380.

According to an embodiment, the QEC circuit 350 may generate clock signals (e.g., duplicate clock signals) that are identical to the first to fourth clock signals I, Q, IB, and QB output by the phase splitter 370. For example, the QEC circuit 350 may include a phase splitter including same characteristics as the phase splitter 370 and may perform the phase skew correction by feeding back the first clock signal I and the second clock signal Q output by the tSAC delayer 360. FIG. 4 illustrates an embodiment in which the output of the tSAC delayer 360 is fed back to the QEC circuit 350. However, the disclosure is not limited to the embodiment illustrated in FIG. 4, and as such, according to another embodiment, the output of the QEC circuit 350 may also be fed back to circuit blocks within the QEC circuit 350.

Figure 5:
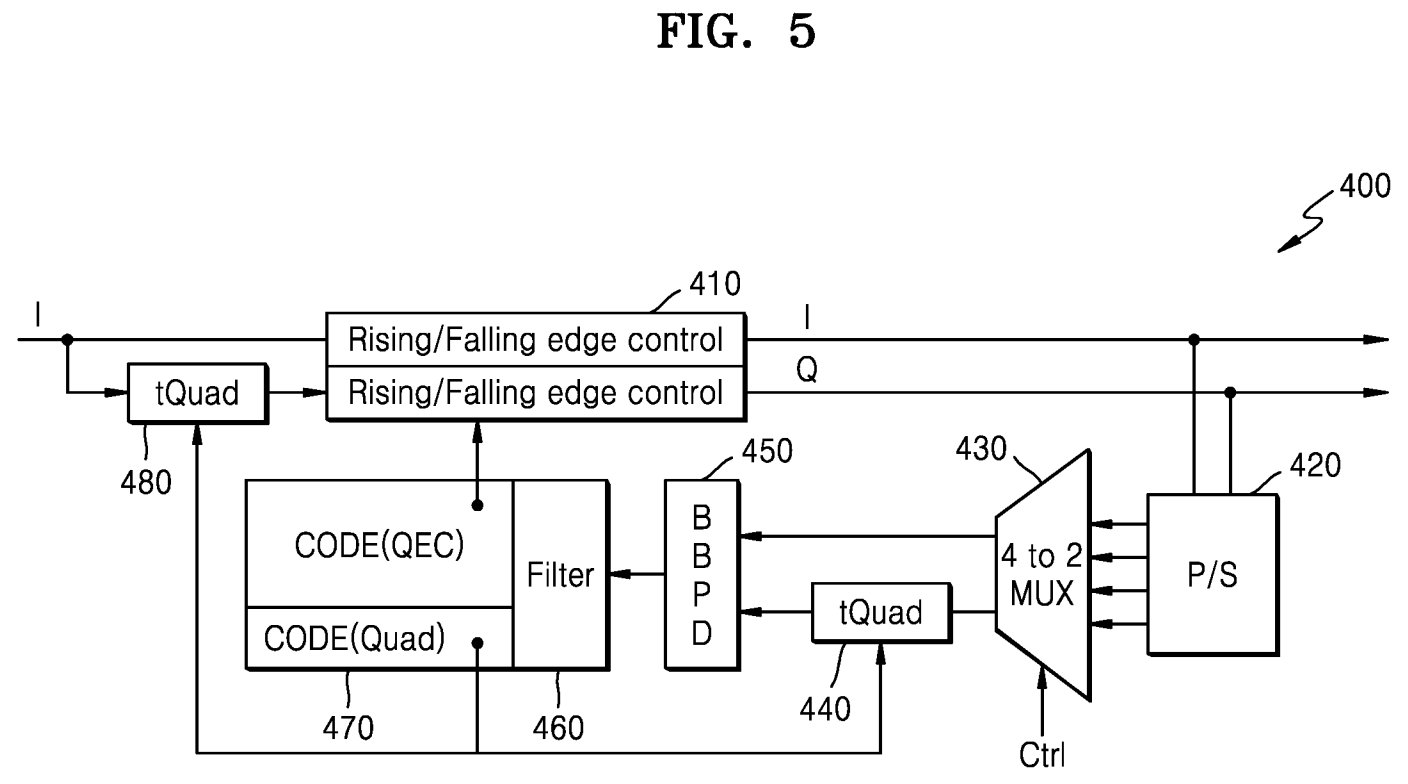

FIG. 5 is a block diagram illustrating an implementation of a QEC circuit according to an embodiment.

Referring to FIG. 5, a QEC circuit 400 may receive the first clock signal I generated by processing the external clock signal CLK and generate the second clock signal Q. The second clock signal Q may have a phase difference of 90 degrees relative to the first clock signal I by performing a delay operation on the first clock signal I. For example, the first clock signal I and the second clock signal Q may have a phase difference of 90 degrees. In addition, the QEC circuit 400 may perform a duty regulation operation on the first clock signal I and/or the second clock signal Q. For example, the QEC circuit 400 may regulate a duty ratio of the first clock signal I and/or the second clock signal Q to 50% or 50+offset %. Furthermore, the QEC circuit 400 may correct the skew between the 90 degrees phase difference between the first clock signal I and the second clock signal Q by correcting the skew between the first clock signal I and the second clock signal Q.

According to an embodiment, the QEC circuit 400 may include a rising/falling edge delay controller 410, a phase splitter 420, a multiplexer (MUX) 430, a first tQuad delayer 440, a phase detector (BBPD) 450, a filter 460, a control code storage circuit 470, and a second tQuad delayer 480. The second tQuad delayer 480 may receive the first clock signal I and may delay the first clock signal I by a predefined amount of time to output the delayed first clock signal I. According to an embodiment, as the second tQuad delayer 480 delays the first clock signal I by an amount of time corresponding to the phase delay of 90 degrees, an output signal of the second tQuad delayer 480 may correspond to the second clock signal Q.

The rising/falling edge delay controller 410 may receive the first clock signal I and the second clock signal Q, may adjust the duty ratio of at least one of the first clock signal I and the second clock signal Q by controlling a delay operation for a rising and/or falling edge of each of the first clock signal I and the second clock signal Q, and may correct the skew between the first clock signal I and the second clock signal Q. According to an embodiment, the rising/falling edge delay controller 410 may adjust the delay of the rising/falling edges of the first clock signal I and the second clock signal Q based on a control code output from the control code storage circuit 470 and may output the first clock signal I and the second clock signal Q with the adjusted duty ratio and/or skew.

The first clock signal I and the second clock signal Q may be fed back to the phase splitter 420 to repeatedly perform a phase comparison and a regulation operation of the control code. The phase splitter 420 may generate the third clock signal IB and the fourth clock signal QB based on a phase delay operation or a phase inversion operation on each of the first clock signal I and the second clock signal Q and may provide the first to fourth clock signals I, Q, IB, and QB to the multiplexer 430. According to an embodiment, the phase splitter 420 within the QEC circuit 400 may generate the duplicate clock signals identical to the signals generated from the phase splitter arranged to provide the 4-phase clock signals to the transmitter, and accordingly, in the case that the phase skew is present in the 4-phase clock signals provided to the transmitter, the skew between the 4-phase clock signals may be detected and corrected as 4-phase clock signals including a same characteristic skew are generated by the phase splitter 420.

According to an embodiment, the phase splitter 420 may include one or more unit inverters and may generate the first to fourth clock signals I, Q, IB, and QB by performing a signal processing on the first clock signal I and the second clock signal Q by using the unit inverters. As an example, the phase splitter 420 may invert the first clock signal I by an odd number of times to generate the third clock signal IB, or may invert the first clock signal I by an even number of times to generate the first clock signal I in a same phase. Additionally, the phase splitter 420 may invert the second clock signal Q by an odd number of times to generate the fourth clock signal QB, or may invert the second clock signal Q by an even number of times to generate the second clock signal Q in the same phase.

The multiplexer 430 may output two clock signals among the first to fourth clock signals I, Q, IB, and QB. The two clock signals may have adjacent phases to each other. The multiplexer 430 may selectively output some of the clock signals based on a control signal Ctrl. According to an embodiment, the control logic 240 arranged in the memory device 200 illustrated in FIG. 2 may generate the control signal Ctrl in the process of correcting the skew.

According to an embodiment, the multiplexer 430 may selectively output the first clock signal I and the second clock signal Q in a case that control loops to correct the phase skew between the first clock signal I and the second clock signal Q are performed. In addition, the multiplexer 430 may selectively output the second clock signal Q and the third clock signal IB in the case that the control loops to correct the phase skew between the second clock signal Q and the third clock signal IB are performed. Furthermore, the multiplexer 430 may selectively output the third clock signal IB and the fourth clock signal QB in the case that the control loops to correct the phase skew between the third clock signal IB and the fourth clock signal QB are performed. Additionally, the multiplexer 430 may selectively output the fourth clock signal QB and the first clock signal I in the case that the control loops to correct the phase skew between the fourth clock signal QB and the first clock signal I are performed.

According to embodiment, one of the two clock signals output from the multiplexer 430 may be provided to the first tQuad delayer 440. For example, any one of the two clock signals output from the multiplexer 430 may be provided to the first tQuad delayer 440. According to an embodiment, the multiplexer 430 may provide the clock signal with an earlier phase among the two clock signals to the first tQuad delayer 440. According to an embodiment, during the control loops to correct the phase skew between the first clock signal I and the second clock signal Q, the first clock signal I may be provided to the phase detector 450 through the first tQuad delayer 440, and the first tQuad delayer 440 may delay an output of the first clock signal I by the predefined amount of time (e.g., the time corresponding to the 90 degree phase delay). The phase detector 450 may detect the phase difference between the first clock signal I with the 90 degrees phase delay and the non-delayed second clock signal QI; for example, the phase detector 450 may detect the skew between the edges of the first clock signal I with the 90 degrees phase delay and the second clock signal Q.

According to an embodiment, the phase detector 450 may include a Bang Bang Phase Detector (BBPD). However, the disclosure not limited to the BBPD, and as such, according to other embodiments, various components to perform the phase detection function may be used instead of the phase detector 450 described above.

The filter 460 may output the control code corresponding to the phase difference detected by the phase detector 450. According to an embodiment, the filter 460 may convert a detection result output from the phase detector 450 to generate the control code. For example, the filter 460 may digitally convert the detection result output from the phase detector 450 to generate the control code. The control code may include a code CODE(QEC) to control the rising/falling edge delay controller 410 and a code CODE(Quad) to control the first tQuad delayer 440 and/or the second tQuad delayer 480.

According to an embodiment, the control code may include a first control code to adjust the rising/falling edge of the first clock signal I, a second control code to adjust the rising/falling edge of the second clock signal Q, a third control code to adjust the amount of delay in the second tQuad delayer 480, and a fourth control code to adjust the amount of delay in the first tQuad delayer 440. The phase detector 450 may detect the clock signal that is ahead in phase among the first clock signal I and the second clock signal Q, the first control code and the second control code may be generated based on the phase difference between the first clock signal I and the second clock signal Q, and the rising/falling edge delay controller 410 may perform the skew correction operation between the first clock signal I and the second clock signal Q based on the first control code and the second control code.

In addition, the skew between the 4-phase clock signals may also be affected by operating characteristics of the first tQuad delayer 440 and the second tQuad delayer 480. According to an embodiment, the third control code may control phases of the two clock signals provided to the phase detector 450 to have the same phase by adjusting the amount of delay in the second tQuad delayer 480 and may enhance the accuracy of the phase detection operation or the skew correction operation. Furthermore, by adjusting the amount of delay in the second tQuad delayer 480, the fourth control code may perform an adjusting operation to allow the phase difference between the first clock signal I and the second clock signal Q output from the QEC circuit 400 to correspond to the 90 degrees.

By repeatedly performing the phase detection operation based on the rising/falling edge control and feedback signals, the skew between the first clock signal I and the second clock signal Q may be corrected. In addition, as the multiplexer 430 outputs the second clock signal Q and the third clock signal IB, the skew between the second clock signal Q and the third clock signal IB may be corrected, and as the multiplexer 430 outputs the third clock signal IB and the fourth clock signal QB, the skew between the third clock signal IB and the fourth clock signal QB may be corrected. Furthermore, as the multiplexer 430 outputs the fourth clock signal QB and the first clock signal I, the skew between the fourth clock signal QB and the first clock signal I may be corrected.

According to an embodiment, the skew correction operation between the first clock signal I and the second clock signal Q may include controlling the edge of the second clock signal Q. Furthermore, the skew correction operation between the second clock signal Q and the third clock signal IB may include controlling an edge of the third clock signal IB. Furthermore, the skew correction operation between the third clock signal IB and the fourth clock signal QB may include controlling an edge of the fourth clock signal QB. Since the edges of the third clock signal IB and the fourth clock signal QB may include phases corresponding to the falling edges of the first clock signal I and the second clock signal Q, the edges of the third clock signal IB and the fourth clock signal QB may be adjusted by adjusting the rising/falling edges of the first clock signal I and the second clock signal Q.

According to an embodiment, the skew correction operation between the fourth clock signal QB and the first clock signal I may include controlling the amount of delay of the second tQuad delayer 480. For example, since the skews of the first clock signal I to the fourth clock signal QB may be sequentially corrected, the delay amount of the second tQuad delayer 480 may be controlled by detecting the phase difference between the fourth clock signal QB and the first clock signal I, and the skew between the fourth clock signal QB and the first clock signal I may be corrected by repeatedly performing the control loops to allow the phase difference between the fourth clock signal QB and the first clock signal I to correspond to the 90 degrees.

The control codes to correct the phase skew between the first to fourth clock signals I, Q, IB, and QB may be stored in the control code storage circuit 470 by performing the process illustrated above. According to an embodiment, the control codes may be set based on the operation of the QEC circuit 400 in the case that the memory device (200) is initially driven, and in the case that the memory device (200) operates normally, the DATA may be transceived by using the first to fourth clock signals I, Q, IB, and QB generated based on the control codes.

Figure 6A:
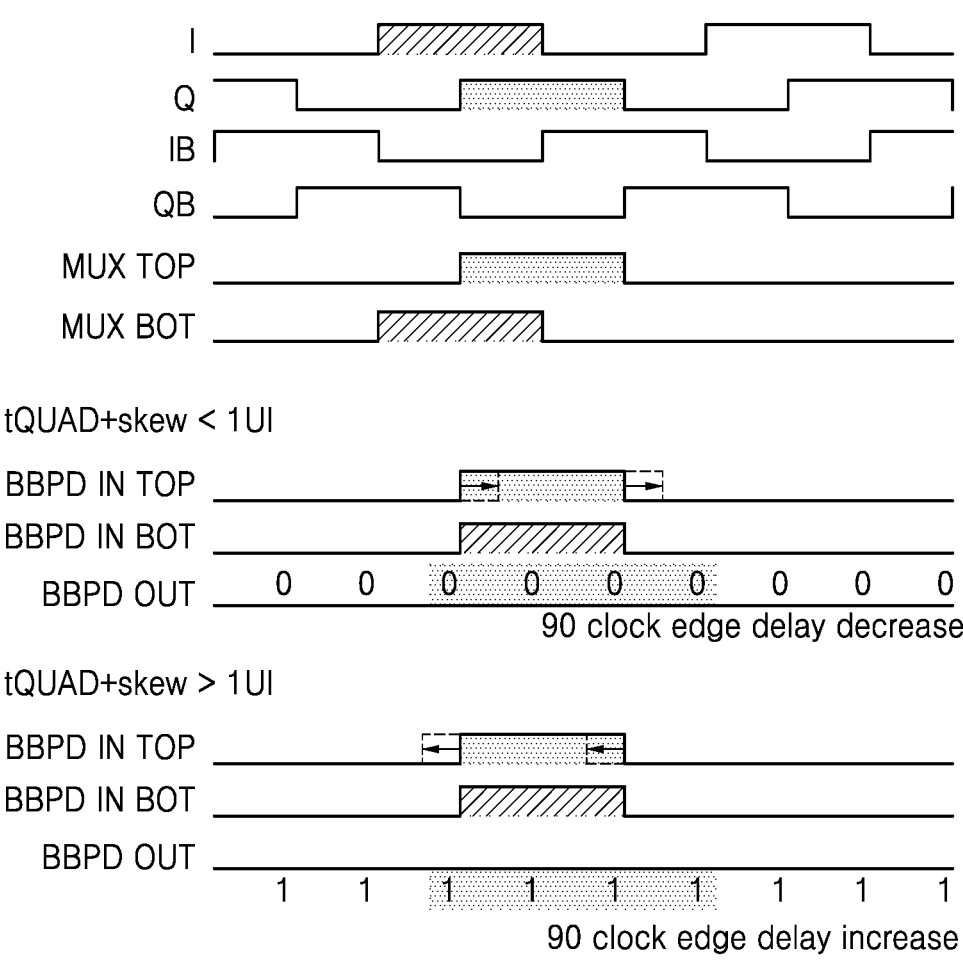
FIGS. 6A and 6B are waveform diagrams illustrating an operation of the QEC circuit of FIG. 5.
Figure 6B:
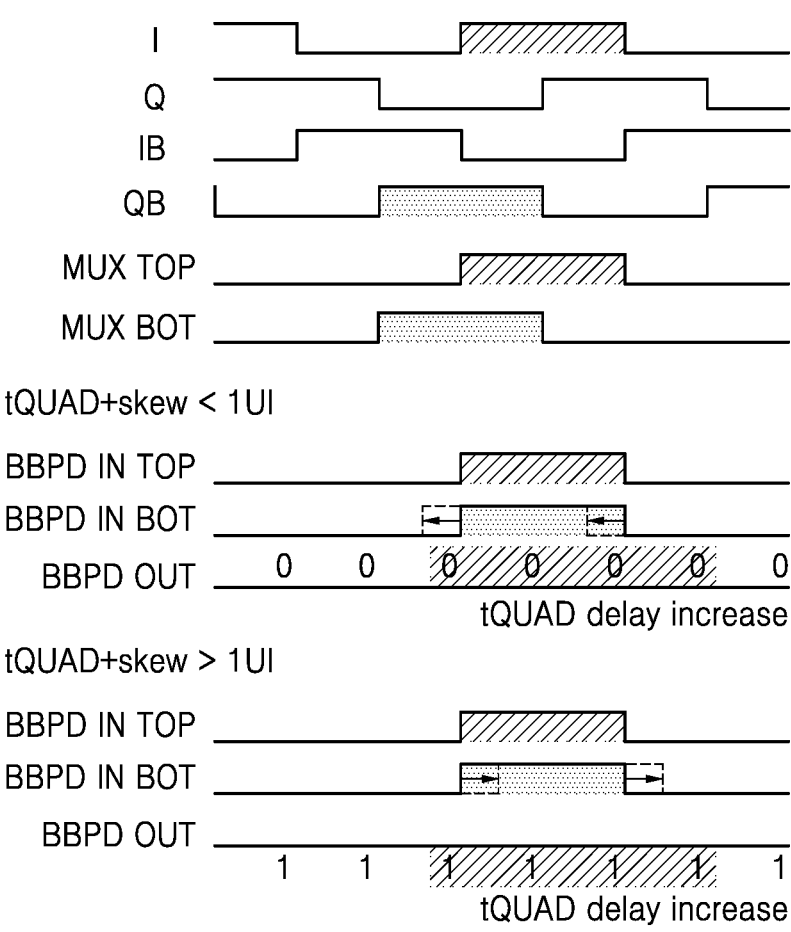

FIGS. 6A and 6B are waveform diagrams illustrating an operation of the QEC circuit of FIG. 5. In FIG. 6A, the skew correction operation based on the phase comparison between the first clock signal I and the second clock signal Q is illustrated, and in FIG. 6B, the skew correction operation based on the phase comparison between the fourth clock signal QB and the first clock signal I is illustrated.

Referring to FIGS. 5 and 6A, the first to fourth clock signals I, Q, IB, and QB may have sequentially the phase difference of 90 degrees, the second clock signal Q may be output from a first output terminal MUX TOP of the multiplexer 430 shown in FIG. 5, and the first clock signal I may be output from a second output terminal MUX BOT of the multiplexer 430. Additionally, the second clock signal Q may be provided to a first input terminal TOP of the phase detector 450, and the first clock signal I to pass through the first tQuad delayer 440 may be provided to a second input terminal BOT of the phase detector 450.

In the case that a delay amount of the sum of the delay amount of the first tQuad delayer 440 and the skew between the first and second clock signals I and Q is less than one data transmission interval 1 UI, the case may mean that a phase of the signal input to the second input terminal BOT among the signals input to the phase detector 450 may be earlier than a phase of the signal input to the first input terminal TOP, and the case may mean that the phase of the second clock signal Q may include the phase difference greater than 90 degrees with respect to the first clock signal I. In this case, the output of the phase detector 450 may include a first logic state (e.g., 0), and the filter 460 may generate the control code to control the rising/falling edge delay controller 410 based on the output of the phase detector 450. According to an embodiment, in the case that the phase detector 450 outputs the first logic state, the control code may include a value to reduce a degree to which the edge of the second clock signal Q is delayed in the rising/falling edge delay controller 410 and may be corrected such that the phase of the second clock signal Q is advanced.

In the case that the delay amount of the sum of the delay amount of the first tQuad delayer 440 and the skew between the first and second clock signals I and Q is greater than one data transmission interval 1 UI, the case may mean that the phase of the signal input to the first input terminal TOP among the signals input to the phase detector 450 may be earlier than the phase of the signal input to the second input terminal BOT, and the case may mean that the phase of the second clock signal Q may have a phase difference less than 90 degrees with respect to the first clock signal I. In this case, the output of the phase detector 450 may include a second logic state (e.g., 1), the control code output from the filter 460 may include a value to increase a degree to which the edge of the second clock signal Q is delayed in the rising/falling edge delay controller 410 and may be corrected such that the phase of the second clock signal Q is delayed.

Similar to the above operation, the skew correction operation between the first to fourth clock signals I, Q, IB, and QB may be performed, and as shown in FIG. 6B, the fourth clock signal QB may be output from the first output terminal MUX TOP and the first clock signal I may be output from the second output terminal MUX BOT. The fourth clock signal QB may have a phase that is 270 degrees late relative to the first clock signal I, or, in other words, the fourth clock signal QB may include a phase that is 90 degrees early relative to the first clock signal I.

In the case that a delay amount of the sum of the delay amount of the first tQuad delayer 440 and the skew between the first and fourth clock signals I and QB is less than one data transmission interval 1 UI, the case may mean that the phase of the signal input to the second input terminal BOT among the signals input to the phase detector 450 may be earlier than the phase of the signal input to the first input terminal TOP and the output of the phase detector 450 may include the first logic state (e.g., 0). In this case, the filter 460 may generate the control code to adjust the amount of delay of the second tQuad delayer 480 based on the output of the phase detector 450. According to an embodiment, in the case that the phase detector 450 outputs the first logic state, the control code may include a value to increase the delay amount of the second tQuad delayer 480, and accordingly, the skew between the fourth clock signal QB and the first clock signal I may be corrected as the output of the second tQuad delayer 480 corresponding to the second clock signal Q is delayed.

In the case that the delay amount of the sum of the delay amount of the first tQuad delayer 440 and the skew between the first and fourth clock signals I and QB is greater than one data transmission interval 1 UI, the case may mean that the phase of the signal input to the first input terminal TOP among the signals input to the phase detector 450 may be earlier and the output of the phase detector 450 may include the second logic state (e.g., 1). In this case, the control code may include a value to reduce the amount of delay of the second tQuad delayer 480, and the skew between the fourth clock signal QB and the first clock signal I may be corrected as the delay of output of the second tQuad delayer 480 corresponding to the second clock signal Q is reduced.

Figure 7:
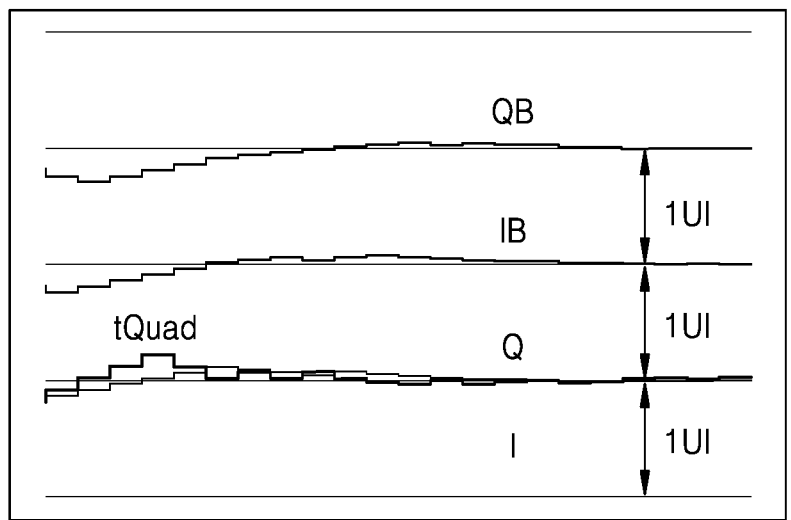
FIG. 7 is a diagram illustrating a process of correcting a skew between 4-phase clock signals by an operation of a QEC circuit according to an embodiment.

FIG. 7 is a diagram illustrating a process of correcting a skew between 4-phase clock signals by an operation of a QEC circuit according to an embodiment.

Referring to FIG. 7, the QEC circuit of a memory device may correct a skew between 4-phase clock signals by using a first clock signal I. A phase difference of the 4-phase clock signals may correspond to one data transmission interval UI or tQuad time.

According to an embodiment, the memory device may receive an external clock signal corresponding to a phase of the first clock signal I from a memory controller, and the QEC circuit may generate a second clock signal Q based on a tQuad delay operation on the external clock signal. Since the second clock signal Q is generated based on the delay operation, as the delay operation is roughly performed on the second clock signal Q, the initial skew between the first clock signal I and the second clock signal Q may include a relatively large value.

Thereafter, a skew correction operation of the QEC circuit according to the embodiment may be performed. For example, the QEC circuit may internally use the first clock signal I and the second clock signal Q to generate first to fourth clock signals I, Q, IB, and IQ, and may perform control loops to correct a skew between the first to fourth clock signals I, Q, IB, and QB. According to the foregoing embodiments, the control loops may be repeated to correct the skew between the first clock signal I and the second clock signal Q, the skew between the second clock signal Q and the third clock signal IB, the skew between the third clock signal IB and the fourth clock signal QB, and the like, and as the control loops are repeatedly performed, the skew between the first and fourth clock signals I, Q, IB, and QB may be corrected to allow the phase difference between the first and fourth clock signals I, Q, IB, and QB to correspond to one data transmission interval UI.

FIG. 8 illustrates an operation method of a memory device including a QEC circuit according to an embodiment. Referring to FIG. 8, in operation S11, the method may include receiving an external clock signal including one phase from an external device. For example, the memory device may receive an external clock signal including one phase from an external device (e.g., a memory controller). The external clock signal may correspond to a phase of any one of multi-phase clock signals related to data transmission or reception, and a period of the external clock signal may include a same value 2T as a period of the multi-phase clock signals. In addition, the external clock signal may correspond to a differential signal including any one signal including one phase and a signal including an inversion phase of the any one signal.

In operation S12, the method may include generating one of multi-phase clock signals by performing a buffering and/or phase-locked loop operation on the received external clock signal. For example, the memory device may generate any one of multi-phase clock signals (for example, the first clock signal I) by performing a buffering and/or phase-locked loop operation on the received external clock signal and may correct a skew between the multi-phase clock signals by using the generated first clock signal I. Using 4-phase clock signals as an example, despite receiving the external clock signal including a relatively low frequency (e.g., the external clock signal including a period of four times the data rate), the memory device may not need to receive two or more external clock signals including a phase difference of 90 degrees from each other and correct a skew between the 4-phase clock signals based on the external clock signal by receiving only the external clock signal including one phase.

As an example, the QEC circuit of the memory device may receive only the first clock signal I and use the first clock signal I to perform the skew correction operation between the 4-phase clock signals. In operation S13, the method may include generating a second clock signal Q by using a tQuad delay operation on the first clock signal I. For example, the QEC circuit may generate a second clock signal Q by using a tQuad delay operation on the first clock signal I. In operation S14, the method may include generating the first to fourth clock signals I, Q, IB, and QB by performing at least one inversion on each of the first clock signal I and the second clock signal Q. For example, the QEC circuit may generate the first to fourth clock signals I, Q, IB, and QB by performing at least one inversion on each of the first clock signal I and the second clock signal Q. In operation S15, the method may include correcting a skew between the first to fourth clock signals I, Q, IB, and QB. For example, the QEC circuit may correct a skew between the first to fourth clock signals I, Q, IB, and QB. The skew may be corrected by repeatedly performing control loops such as a phase detection on the first to fourth clock signals I, Q, IB, and QB and an edge delay control according to a detection result.

The QEC circuit may output at least one clock signal including the skew corrected by the skew correction operation and may output, for example, the first clock signal I and the second clock signal Q. The memory device may generate the first to fourth clock signals I, Q, IB, and QB, each including a period of value 2T, based on a phase-splitting operation on the first clock signal I and the second clock signal Q. Furthermore, in operation S16, the method may include sequentially outputting the first to fourth data at edge timings of the first to fourth clock signals I, Q, IB, and QB. For example, the memory device may include a transmitter to receive multiple data (e.g., first to fourth data) in parallel, and the transmitter may sequentially output the first to fourth data at edge timings of the first to fourth clock signals I, Q, IB, and QB.

FIG. 9 illustrates an operation method of the QEC circuit according to another embodiment.

Referring to FIG. 9, in operation S21, the method may include receiving a first clock signal I generated inside a memory device based on an external clock signal. For example, a QEC circuit may receive a first clock signal I generated inside a memory device based on an external clock signal and use the first clock signal I to perform a skew correction operation between first to fourth clock signals I, Q, IB, and QB. According to an embodiment, in operation S22, the method may include generating the second clock signal Q by operating a tQuad delay on the first clock signal I. For example, the QEC circuit may generate the second clock signal Q by operating a tQuad delay on the first clock signal I. In operation S23, the method may include generating the first to fourth clock signals I, Q, IB, and QB based on the first clock signal I and the second clock signal Q. For example, the QEC circuit may generate the first to fourth clock signals I, Q, IB, and QB by using the first clock signal I and the second clock signal Q. As an example, the QEC circuit may include a phase splitter including a same signal processing characteristics as a phase splitter to generate the first to fourth clock signals I, Q, IB, and QB provided to a data transceiver and may generate the first to fourth clock signals I, Q, IB, and QB by using the phase splitter.

In operation S24, the method may include performing a phase comparison operation by using two clock signals including phases adjacent to each other among the first to fourth clock signals I, Q, IB, and QB. For example, the QEC circuit may perform a phase comparison operation by using two clock signals including phases adjacent to each other among the first to fourth clock signals I, Q, IB, and QB and may perform control loops to overall compare phases of the first to fourth clock signals I, Q, IB, and QB. One or more control codes may be generated based on a result of comparing the phases between the first to fourth clock signals I, Q, IB, and QB. In operation S25, the method may include controlling edge delay on first to fourth clock signals based on the phrase comparison result. For example, based on the result of comparing the phases between the first to fourth clock signals I, Q, IB, and QB, a skew correction operation may be performed by an edge delay processing on at least some clock signals of the first to fourth clock signals I, Q, IB, and QB. In operation S26, the method may include controlling a tQuad delay operation to generate the second clock signal Q based on the result of comparing the phases between the first to fourth clock signals I, Q, IB, and QB. For example, the QEC circuit may control a tQuad delay operation to generate the second clock signal Q based on the result of comparing the phases between the first to fourth clock signals I, Q, IB, and QB.

In operation S27, the method may include outputting the first to fourth clock signals I, Q, IB, and QB including the skew corrected such that the phase between adjacent signals is 90 degrees by performing the above control loops. For example, the QEC circuit may output the first to fourth clock signals I, Q, IB, and QB including the skew corrected such that the phase between adjacent signals is 90 degrees by performing the above control loops. As one example, the QEC circuit may output the first clock signal I and the second clock signal Q including the corrected skew. Based on the phase splitter operation on the first clock signal I and the second clock signal Q, the memory device may generate the first to fourth clock signals I, Q, IB, and QB used for data transceiving operation.

Figure 10:
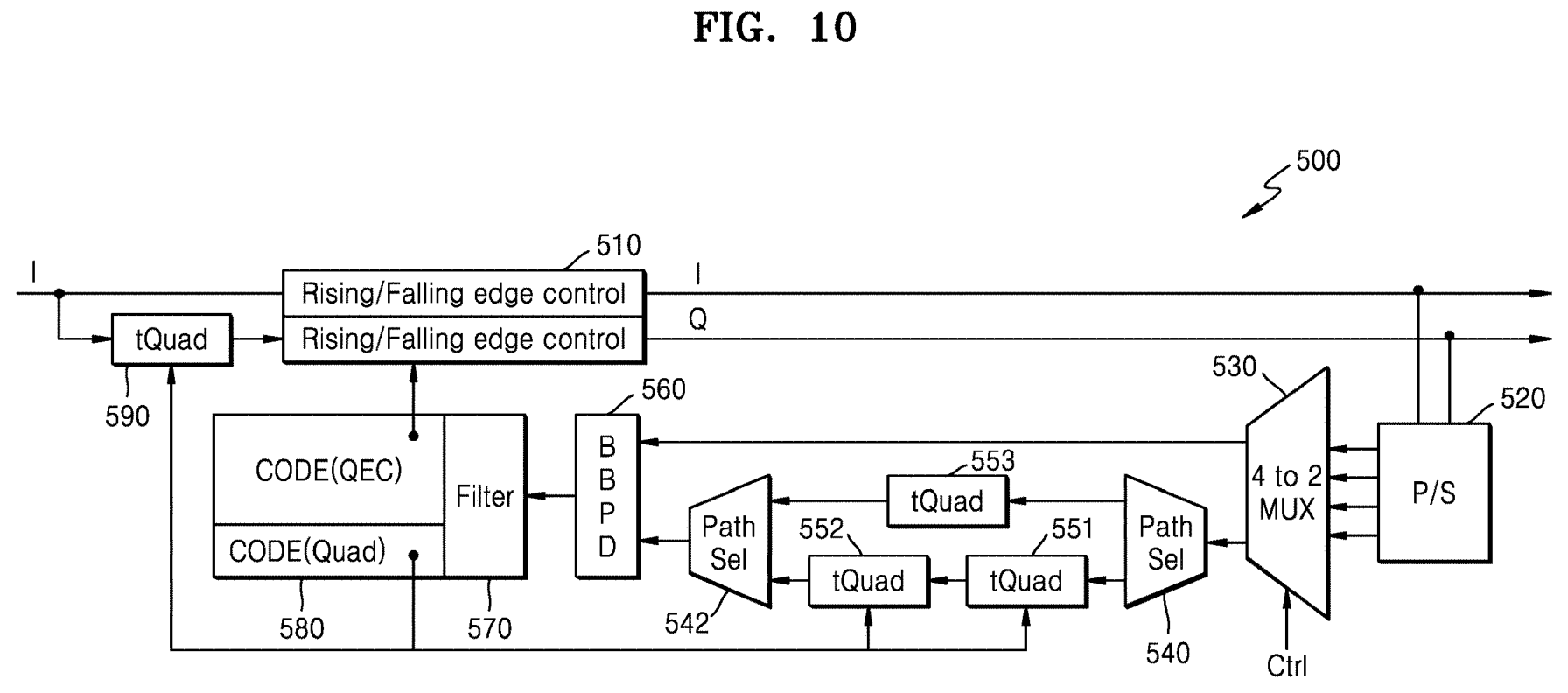

FIG. 10 is a block diagram illustrating an implementation of a QEC circuit according to another embodiment.

For example, a QEC circuit 500 may include a rising/falling edge delay controller 510, a phase splitter 520, a multiplexer 530, a first path selector 541, a second path selector 542, a first tQuad delayer 551, a second tQuad delayer 552, a third tQuad delay 553, a phase detector 560, a filter 570, a control code storage circuit 580, and a fourth tQuad delayer 590. The fourth tQuad delayer 590 may receive the first clock signal I, delay the first clock signal I by a predefined amount of time, and output the delayed first clock signal I. According to an embodiment, the fourth tQuad delayer 590 may delay the first clock signal I by the predefined amount of time corresponding to a phase delay of 90 degrees, accordingly, an output signal of the fourth tQuad delayer 590 may correspond to a second clock signal Q.

In accordance with the foregoing embodiments, the rising/falling edge delay controller 510 may control a delay operation on rising and/or falling edges of at least some of the first to fourth clock signals I, Q, IB, and QB generated within the QEC circuit 500. Further, the phase splitter 520 may generate the first to fourth clock signals I, Q, IB, and QB based on a phase delay operation or a phase inversion operation. In addition, the phase detector 560 may perform an operation of detecting a phase difference between input clock signals, and the filter 570 may output a control code corresponding to the phase difference detected by the phase detector 560, and the control code storage circuit 580 may store at least one control code generated from the filter 570.

According to an embodiment, an operation of correcting a skew between the first to fourth clock signals I, Q, IB, and QB may include a first operation and a second operation. As an example, in the first operation, any one clock signal output from the multiplexer 530 may be transferred through a first path including the first tQuad delayer 551 and the second tQuad delayer 552, and in the second operation, any one clock signal output from the multiplexer 530 may be transferred through a second path including the third tQuad delayer 553.

For example, the first operation may perform an operation to adjust an amount of delay of the fourth tQuad delayer 590 to set a phase of the second clock signal Q to include a phase difference of an approximate 90 degrees with respect to the first clock signal I. In addition, the second operation may perform an operation to correct a skew between the first to fourth clock signals I, Q, IB, and QB by using a same or similar method as the above-described embodiments.

The multiplexer 530 may receive the first to fourth clock signals I, Q, IB, and QB and selectively output two clock signals. According to an embodiment, in the first operation, the multiplexer 530 may output clock signals to include a phase difference of 180 degrees, and may output the first clock signal I and the third clock signal IB as an example. In addition, one of the first clock signal I and the third clock signal IB may be provided to the phase detector 560, and the other may be provided to the first tQuad delayer through the first path selector 541. Additionally, the second path selector 542 may provide an output of the second tQuad delayer 552 to the phase detector 560.

The phase detector 560 may compare phases of the clock signal provided from the multiplexer 530 and the clock signal provided from the second tQuad delayer 552. According to an embodiment, an amount of delay by the first tQuad delayer 551 and the second tQuad delayer 552 may correspond to 180 degrees, and the phase detector 560 may detect whether the phases of the two input clock signals are identical. The filter 570 may generate a control code to control an amount of delay of the fourth tQuad delayer 590 based on a phase detection result. According to an embodiment, the filter 570 may further generate a control code to control delay amounts of the first tQuad delayer 551 and the second tQuad delayer 552 based on the phase detection result.

By performing control loop as described above multiple times, the delay amount of the fourth tQuad delayer 590 may be roughly controlled, and the phase of the second clock signal Q may be roughly adjusted. According to an embodiment, each delay amount of the first delayer 551, the second tQuad delayer 552, and the fourth tQuad delayer 590 may be set equal to each other, and by comparing an identity of the phase of the first clock signal I and the third clock signal IB after two tQuad delays, the control operation may be performed such that the delay amount of each tQuad corresponds to approximately 90 degrees. Further, in the case that the phase difference between the first clock signal I and the second clock signal Q falls within a predefined target range, the first operation may end, and the second operation may begin.

After the first operation, the QEC circuit 500 may perform the second operation to correct the skew between the first to fourth clock signals I, Q, IB, and QB. According to an embodiment, in the second operation, the multiplexer 430 may output two clock signals that are adjacent to each other in phase (e.g., 90 degrees), one clock signal may be provided to the phase detector 560, and the other clock signal may be provided to the third tQuad delayer 553. Further, the phase detector 560 may compare the phases of the two input clock signals to each other, and the filter 570 may generate the control codes to control the rising/falling edge delay controller 510 and the at least one tQuad delayer based on the phase detection result. In addition, the QEC circuit 500 may iteratively perform the control loops according to the aforementioned embodiments, and correct the skew between the first to fourth clock signals I, Q, IB, and QB based on the phase detection operation and the control code generation operation. According to an embodiment, as the delay amount of the fourth tQuad delayer 590 is set in the first operation, in the second operation, the delay amount of the fourth tQuad delayer 590 may not be controlled, and the control operation on the delay amount may be selectively performed only for the third tQuad delayer 553.

Figure 11:
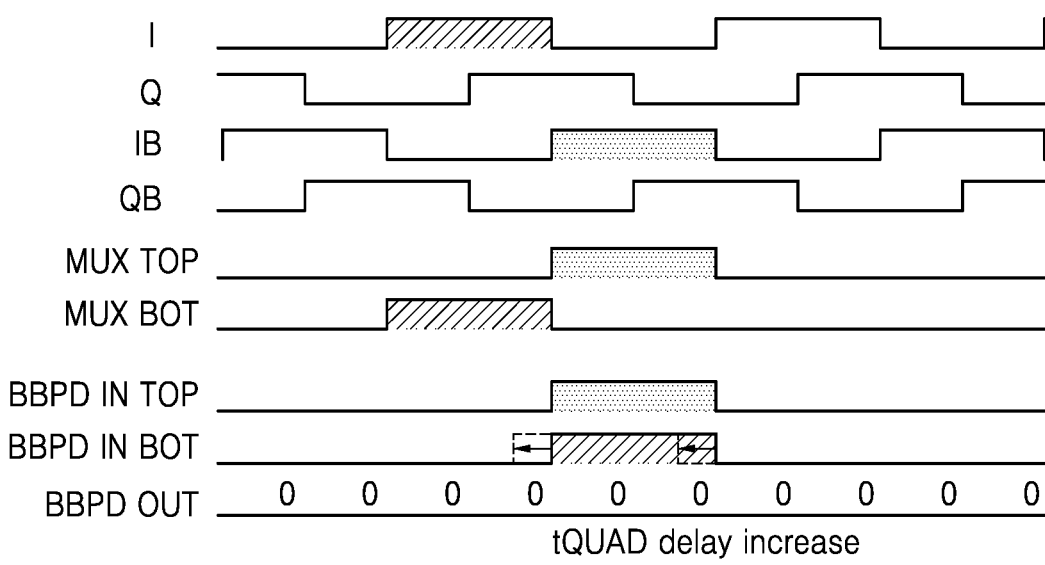
FIG. 11 is a waveform diagram illustrating an operation of the QEC circuit of FIG. 10.

FIG. 11 is a waveform diagram illustrating an operation of the QEC circuit of FIG. 10. In FIG. 11, an example of the operation in the first operation of the QEC circuit of FIG. 10 is shown, and as described above, since the operation of the second operation is same or similar to the operation shown in FIGS. 6A and 6B, a detailed description of the operation of the second operation is omitted.

Referring to FIG. 11, the third clock signal IB may be output from a first output terminal MUX TOP of the multiplexer 530, and the first clock signal I may be output from a second output terminal MUX BOT. In addition, as the first clock signal I is delayed by the first tQuad delayer 551 and the second tQuad delayer 552, in the case that the delay by the first tQuad delayer 551 and the second tQuad delayer 552 corresponds to 180 degrees, phases of the signals input to the two input terminals TOP and BOT of the phase detector 560 may include a same phase.

On the other hand, in the case that the delay amount by the first tQuad delayer 551 and the second tQuad delayer 552 is less than 180 degrees or the delay amount of one of the first tQuad delayer 551 and the second tQuad delayer 552 is less than 90 degrees, the phase of the signal input to the second input terminal BOT of the phase detector 560 may be fast, and accordingly, the output of the phase detector 560 may include the first logic state (e.g., 0). In this case, the filter 460 may generate the control code to increase the delay amount of the fourth tQuad delayer 590. By repeating the above operation multiple times, the first operation may be completed after the delay amount of the fourth tQuad delayer 590 is set to approximately 90 degrees.

According to an embodiment, in the case that the phase of the signal input to the first input terminal TOP of the phase detector 560 is fast, the control code to reduce the delay amount of the fourth tQuad delayer 590 may be generated. In addition, after the delay amount of the fourth tQuad delayer 590 is roughly set, the control code for the rising/falling edge delay controller 510 may be set by performing the second operation, and the QEC circuit 500 based on the preset control code may output the first clock signal I and a second clock signal Q to include the phase difference of 90 degrees from each other and the corrected skew.

Meanwhile, the operation of roughly setting the delay amount of the tQuad delayer in a preceding stage of the rising/falling edge delay controller 510 shown in FIG. 11 may also be applied to the embodiments of FIGS. 5, 6A, and 6B. For example, the phase comparison and control code generation operation in FIGS. 5, 6A, and Bb may be repeatedly performed, and in the case that the delay amount of the second tQuad delayer 480 satisfies a value within the predefined range, the operation to control the delay amount of the second tQuad delayer 480 may end. Subsequently, by repeating the phase comparison and control code generation operation, the control code to control the rising/falling edge delay controller 410 may be set up, which may allow the QEC circuit 400 to output the first clock signal I and the second clock signal Q to include the phase difference of 90 degrees from each other and corrected skew.

According to an embodiment, the two clock signals among the first to fourth clock signals I, Q, IB, and QB in FIGS. 5, 6A, and 6B as described above may be selectively output from the multiplexer 430, in the skew correction operation to use the first and second clock signals I and Q, the delay amount of the second tQuad delayer 480 may be set and fixed, and subsequently, during the skew correction operation to use the other signals, the operation may be performed in which the control code is set to control the rising/falling edge delay controller 410.

FIG. 12 is a block diagram illustrating a data processing system including an SoC according to an embodiment. As shown in FIG. 12, a data processing system 600 may include an AP 610 and a semiconductor device 620, and the AP 610 may be implemented as the SoC. The semiconductor device 620 may include an internal clock generator 621, an interface circuit 622, and a control logic 623, and the interface circuit 622 may include a Double Data Rate Physical Layer Protocol (DDR PHY).

The internal clock generator 621 may receive an external clock signal CLK from the AP 610, and generate an internal clock signal by using the external clock signal CLK. The internal clock generator 621 may generate the multi-phase clock signals described in the foregoing embodiments. In addition, in the case that the semiconductor device 620 corresponds to a memory device, the AP 610 may provide a write clock WCK according to a predefined standard as the external clock signal CLK. The control logic 623 may control all internal operations of the semiconductor device 620, and may perform control operations to allow a transmitter or receiver included in the interface circuit 622 to function according to embodiments.

The AP 610 may include various intellectual properties (IPs). According to an embodiment, the AP 610 may include a processor 611 to control overall operations and a memory 612 to store instructions executable by the processor 611.

In addition, the AP 610 may further include a Memory Control Unit (MCU) 613 to control an external memory device based on a control of the processor 611 and a DDR PHY 614 to provide an interface with an outside. The DDR PHY 614 may include the transmitter or receiver according to the embodiments.

Various types of system bus standards may be applied to the AP 610, for example, an Advanced Microcontroller Bus Architecture (AMBA) protocol of Advanced RISC Machine (ARM) company may be applied to the AP 610. A bus type of the AMBA protocol may include Advanced High-Performance Bus (AHB), Advanced Peripheral Bus (APB), Advanced extensible Interface (AXI), AXI4, AXI Coherency Extensions (ACE), and the like. In addition, other types of protocols such as uNetwork of SONICs Inc., CoreConnect of IBM company, and Open Core Protocol of OCP-IP company may be applied to the AP 610.

According to an embodiment, the transmitter may be included in various types of semiconductor devices. As an example, the semiconductor device 620 may include a device to output data to the AP 610, may include an image processing device to output image data, may include a non-volatile memory device to store content or the like, may include a communication device to provide the AP 610 with data that is transmitted wired or wirelessly from an external source, and so on. Further, in accordance with an embodiment, the semiconductor device 620 may receive an external clock signal CLK to include a same frequency (or a same period) as an internal clock signal. For example, the semiconductor device 620 may receive the external clock signal CLK with one phase or a differential signal of the external clock signal CLK, and with respect to 4-phase clock signals, the external clock signal CLK may include a frequency of one-quarter of a data rate.

Further, in accordance with an embodiment, the semiconductor device 620 may include a QEC circuit, and the QEC circuit may use any one of the 4-phase clock signals to correct a skew between the 4-phase clock signals. As an example, the QEC circuit of the semiconductor device 620 may be implemented according to the embodiments illustrated in FIGS. 1 to 11.

According to the embodiments as described above, a number of circuit blocks after a clock buffer to receive clock signals from an external source and a number of routings may be reduced by half or nearly half, accordingly, circuit implementation costs may be reduced, and an integration may be increased. In addition, in improving an accuracy of the skew between the multi-phase clock signals without lowering a frequency of an external clock signal, since a skew correction operation may be performed by receiving one external clock signal (or one differential signal) instead of receiving two or more external clock signals with a phase difference of 90 degrees or other angles from an outside, a number of pads for receiving the external clock signal may be reduced, and power consumption may also be reduced.

As above, embodiments are disclosed in the drawings and specifications. Although the embodiments are described using specific terms in this specification, the specific terms are only used for the purpose of explaining the inventive concept, and are not intended to limit the meaning or scope of the disclosure as recited in the patent claims accordingly. Therefore, those of ordinary skill in the art will understand that various modifications and equivalent other embodiments are possible therefrom. Accordingly, the true technical scope of protection of the inventive concept should be determined by the appended claims.

While the inventive concept has been particularly shown and described with reference to embodiments thereof, it will be understood that various changes in form and details may be made therein without departing from the spirit and scope of the following claims.

What is claimed is:

1. A memory device comprising:
a clock receiver configured to receive an external clock signal;
a transmitter configured to receive a plurality of data in parallel and sequentially output the plurality of data based on a plurality of clock signals having a same frequency as the external clock signal, each one of the plurality of clock signals having a phase different from another one of the plurality of clock signals; and
a quadrature error correction (QEC) circuit configured to:
receive only a first clock signal among the plurality of clock signals, the first clock signal having a first phase,
generate a second clock signal among the plurality of clock signals, based on a delay operation with respect to the first clock signal, the second clock signal having a second phase different from the first phase of the first clock signal, and
correct a skew between the plurality of clock signals by performing a phase comparison between the plurality of clock signals generated based on the first clock signal and the second clock signal.

2. The memory device of claim 1, wherein the plurality clock signals comprise the first clock signal, the second clock signal, a third clock signal and a fourth clock signal which have a sequential phase difference of 90 degrees in this order, and
wherein the QEC circuit comprises:
a first delayer configured to output the second clock signal by performing a first quad delay operation on the first clock signal;
a control code storage configured to store a first control code generated based on the phase comparison between the plurality of clock signals; and
an edge controller configured to receive the first clock signal and the second clock signal, and control at least one of a first rising edge and a first falling edge of the first clock signal and at least one of a second rising edge and a second falling edge of the second clock signal based on the first control code.

3. The memory device of claim 2, wherein the QEC circuit further comprises:
a phase splitter configured to output the first to fourth clock signals by performing a signal processing on the first clock signal and the second clock signal;
a multiplexer configured to selectively output two clock signals from among the first to fourth clock signals;
a second delayer configured to perform a second quad delay operation on one of the two clock signals output from the multiplexer; and
a phase detector configured to perform the phase comparison between a clock signal output from the multiplexer and a clock signal output from the second delayer, and output a comparison result.

4. The memory device of claim 3, further comprising:
a control code generator configured to generate the first control code based on the comparison result output from the phase detector,
wherein the first control code generated from the control code generator is stored in the control code storage.

5. The memory device of claim 4, wherein the control code generator is further configured to generate:

a second control code to control the first delayer to adjust a phase difference between the first clock signal and the second clock signal, and a third control code to control the second quad delay operation on the one of the two clock signal output from the multiplexer by controlling the second delayer.

6. The memory device of claim 3, wherein the multiplexer is configured to: selectively output the first clock signal and the second clock signal in an operation of correcting the skew between the first clock signal and the second clock signal, selectively output the second clock signal and the third clock signal in an operation of correcting the skew between the second clock signal and the third clock signal, selectively output the third clock signal and the fourth clock signal in an operation of correcting the skew between the third clock signal and the fourth clock signal, and selectively output the fourth clock signal and the first clock signal in an operation of correcting the skew between the fourth clock signal and the first clock signal.

7. The memory device of claim 3, wherein the phase detector comprises a Bang Bang Phase Detector.

8. The memory device of claim 3, further comprising:

a control code generator configured to generate a control code based on the comparison result output from the phase detector for correcting the skew between the plurality of clock signals.

9. The memory device of claim 2, wherein the QEC circuit further comprises:

a phase splitter configured to output the first to fourth clock signals by performing a signal processing on the first clock signal and the second clock signal;

a multiplexer configured to selectively output two clock signals from among the first to fourth clock signals;

at least one second delayer provided on a first path and configured to perform a second quad delay operation on one of the two clock signals output from the multiplexer;

at least one third delayer provided on a second path different from the first path and configured to perform a third quad delay operation on any one of the two clock signals output from the multiplexer; and a phase detector configured to perform a phase comparison between the clock signal output from the multiplexer and a clock signal provided from the first path or the second path and provide a comparison result.

10. The memory device of claim 9, wherein, in a first operation, the multiplexer is further configured to output the two clock signals having a phase difference of 180 degrees from each other, and an even number of quad delay operations are performed on the clock signal provided via the second path, wherein the phase detector is configured to perform a phase comparison between the clock signal output from the multiplexer and the clock signal provided from the second path; and wherein, by controlling the first delayer based on a result of the phase comparison, the second clock signal is controlled to have a phase difference of 90 degrees relative to the first clock signal.

11. The memory device of claim 10, wherein, in a second operation, the multiplexer is further configured to output the two clock signals having a phase difference of 90 degrees from each other, and an odd number of quad delay operations are performed on the clock signal provided via the first path, wherein the phase detector is configured to a phase comparison between the clock signal output from the multiplexer and the clock signal provided via the first path; and wherein the skew between the first to fourth clock signals is corrected by controlling at least one of the first rising edge and the first falling edge of the first clock signal and at least one of the second rising edge and the second falling edge of the second clock signal based on a result of the phase comparison.

12. The memory device of claim 1, wherein the clock receiver is configured to receive a differential clock signal comprising the external clock signal and an inversion signal of the external clock signal.

13. The memory device of claim 12, wherein the plurality of clock signals comprise the first clock signal, the second clock signal, a third clock signal and a fourth clock signal which have a sequential phase difference of 90 degrees in this order, and wherein the memory device further comprises:

a buffer configured to output the first clock signal and an inversion signal of the first clock signal based on a buffer operation on the differential clock signal;

a multiplexer configured to selectively output the first clock signal among the first clock signal and the inversion signal of the first clock signal; and a phase locked loop configured to perform a phase locked loop operation on the first clock signal and provide the first clock signal to the QEC circuit.

14. The memory device of claim 1, wherein the external clock signal comprises a period divided by 4 compared to a data rate output by the transmitter.

15. The memory device of claim 1, wherein the QEC circuit further comprises:

a phase splitter configured to output the plurality of clock signals by performing a signal processing on the first clock signal and the second clock signal.

16. The memory device of claim 15, wherein the QEC circuit further comprises:

a phase detector configured to:

perform the phase comparison between two of the plurality of clock signals output by the phase splitter, and output a comparison result of the phase comparison.

17. A memory device comprising:

a clock receiver configured to receive an external clock signal;

a transmitter configured to receive a plurality of data in parallel and sequentially output the plurality of data based on a plurality of clock signals having a same frequency as the external clock signal, each one of the plurality of clock signals having a phase different from another one of the plurality of clock signals; and a quadrature error correction (QEC) circuit configured to:

selectively receive a first clock signal among the plurality of clock signals, the first clock signal having a first phase, generate a second clock signal based on a delay operation with respect to the first clock signal, the second clock signal having a second phase different from the first phase of the first clock signal, and correct a skew between the plurality of clock signals by performing a phase comparison between the plurality of clock signals generated based on the first clock signal and second clock signal, wherein the plurality clock signals comprise a first clock signal, a second clock signal, a third clock signal and a fourth clock signal which have a sequential phase difference of 90 degrees in this order, and wherein the QEC circuit comprises:

a first delayer configured to output the second clock signal by performing a first quad delay operation on the first clock signal;

a control code storage configured to store a first control code generated based on the phase comparison between the plurality of clock signals; and an edge controller configured to receive the first clock signal and the second clock signal, and control at least one of a first rising edge and a first falling edge of the first clock signal and at least one of a second rising edge and a second falling edge of the second clock signal based on the first control code.

18. A memory device comprising:

a clock receiver configured to receive an external clock signal;

a transmitter configured to receive a plurality of data in parallel and sequentially output the plurality of data based on a plurality of clock signals having a same frequency as the external clock signal, each one of the plurality of clock signals having a phase different from another one of the plurality of clock signals; and a quadrature error correction (QEC) circuit configured to:

selectively receive a first clock signal among the plurality of clock signals, the first clock signal having a first phase, generate a second clock signal based on a delay operation with respect to the first clock signal, the second clock signal having a second phase different from the first phase of the first clock signal, and correct a skew between the plurality of clock signals by performing a phase comparison between the plurality of clock signals generated based on the first clock signal and second clock signal, wherein the clock receiver is configured to receive a differential clock signal comprising the external clock signal and an inversion signal of the external clock signal, wherein the plurality of clock signals comprise the first clock signal, the second clock signal, a third clock signal and a fourth clock signal which have a sequential phase difference of 90 degrees in this order, and wherein the memory device further comprises:

a buffer configured to output the first clock signal and an inversion signal of the first clock signal based on a buffer operation on the differential clock signal;

a multiplexer configured to selectively output the first clock signal among the first clock signal and the inversion signal of the first clock signal; and a phase locked loop configured to perform a phase locked loop operation on the first clock signal and provide the first clock signal to the QEC circuit.

* * * * *